US012283444B2

(12) United States Patent
Kawada

(10) Patent No.: US 12,283,444 B2
(45) Date of Patent: Apr. 22, 2025

(54) VACUUM INTERRUPTER

(71) Applicant: Mitsubishi Electric Corporation, Tokyo (JP)

(72) Inventor: Masashi Kawada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 133 days.

(21) Appl. No.: 17/916,612

(22) PCT Filed: May 28, 2020

(86) PCT No.: PCT/JP2020/021147
§ 371 (c)(1),
(2) Date: Oct. 3, 2022

(87) PCT Pub. No.: WO2021/240733
PCT Pub. Date: Dec. 2, 2021

(65) Prior Publication Data

US 2023/0154705 A1 May 18, 2023

(51) Int. Cl.
*H01H 1/02* (2006.01)
*H01H 33/66* (2006.01)
*H01H 33/664* (2006.01)

(52) U.S. Cl.
CPC ...... *H01H 33/6641* (2013.01); *H01H 1/0203* (2013.01); *H01H 33/6606* (2013.01); *H01H 2033/6613* (2013.01)

(58) Field of Classification Search
CPC ........... H01H 33/6641; H01H 33/6606; H01H 33/6642; H01H 33/6644;
(Continued)

(56) References Cited

U.S. PATENT DOCUMENTS 4,473,731 A 9/1984 Yorita
4,588,879 A * 5/1986 Noda ................ H01H 33/6644 218/127
(Continued)

FOREIGN PATENT DOCUMENTS

JP H05190062 A 7/1993
JP H07-85754 A 3/1995
(Continued)

OTHER PUBLICATIONS

International Search Report (PCT/ISA/210) with translation and Written Opinion (PCT/ISA/237) mailed on Aug. 4, 2020, by the Japan Patent Office as the International Searching Authority for International Application No. PCT/JP2020/021147. (8 pages).
(Continued)

*Primary Examiner* — William A Bolton
(74) *Attorney, Agent, or Firm* — BUCHANAN, INGERSOLL & ROONEY PC

(57) ABSTRACT

Provided is a vacuum interrupter capable of improving an axial magnetic field intensity even at a contact portion other than a region of the contact portion corresponding to a region surrounded by an arm portion and a coil portion. In the vacuum interrupter according to the present disclosure, in each coil electrode, a bypass portion has: a second coil portion which extends so as to have an overlap with a corresponding first coil portion and a power feeding portion opposed to the first coil portion, in a circumferential direction; a first arm portion which connects the second coil portion and a ring portion; and a second arm portion which connects the second coil portion and the first coil portion.

13 Claims, 14 Drawing Sheets

(58) Field of Classification Search
CPC ......... H01H 2033/6613; H01H 1/0203; H01H 33/6645; H01H 33/6646
USPC ................. 218/118, 123, 127, 128, 129, 141
See application file for complete search history.

(56) References Cited

U.S. PATENT DOCUMENTS

| | | | | |
|---|---|---|---|---|
| 4,704,506 | A | 11/1987 | Kurosawa et al. | |
| 5,495,085 | A | 2/1996 | Yorita et al. | |
| 5,597,993 | A | 1/1997 | Yorita et al. | |
| 5,646,386 | A | 7/1997 | Yorita et al. | |
| 6,479,778 | B1 * | 11/2002 | Kimura | H01H 33/6642 218/123 |
| 8,754,346 | B2 * | 6/2014 | Harada | H01H 33/6642 218/118 |
| 9,040,862 | B2 * | 5/2015 | Ryu | H01H 33/6644 218/123 |
| 9,922,777 | B1 * | 3/2018 | Li | H01H 33/6606 |
| 10,128,070 | B2 * | 11/2018 | Zhou | H01H 33/664 |
| 2012/0091102 | A1 * | 4/2012 | Kim | H01H 33/6643 218/128 |
| 2019/0035578 | A1 * | 1/2019 | Ochi | H01H 33/6643 |

FOREIGN PATENT DOCUMENTS

| | | | |
|---|---|---|---|
| JP | H09115398 | A | 5/1997 |
| JP | 2002150902 | A | 5/2002 |
| JP | 2004363039 | A | 12/2004 |

OTHER PUBLICATIONS

Extended European Search Report dated Jun. 5, 2023, issued in the corresponding European Patent Application No. 20938481.7, 12 pages.
Notice of Reasons for Refusal dated Nov. 21, 2023, issued in the corresponding Japanese Patent Application No. 2022-527401, 7 pages including 3 pages of English Translation.
Decision of Refusal dated Apr. 2, 2024, issued in the corresponding Japanese Patent Application No. 2022-527401, 10 pages including 5 pages of English Translation.
Reconsideration Report by Examiner before Appeal dated Jul. 2, 2024, issued in the corresponding Japanese Patent Application No. 2022-527401, 4 pages including 2 pages of English Translation.
Office Action dated Jun. 21, 2024, issued in the corresponding Korean Patent Application No. 10-2022-7039397, 11 pages including 6 pages of English Translation.
Korean Office Action dated Feb. 5, 2025, issued in the corresponding Korean Patent Application No. 10-2022-7039397, 6 pages including 3 pages of English Translation.

* cited by examiner

VACUUM INTERRUPTER

TECHNICAL FIELD

The present disclosure relates to a vacuum interrupter configured to diffuse an arc generated at the time of current interruption, by a magnetic field generated by a current flowing through an electrode.

BACKGROUND ART

A vacuum interrupter includes a cylindrical vacuum container, electrode rods which are provided at both end portions of the vacuum container, respectively, annular coil electrodes which are provided at opposed end portions of the respective electrode rods, respectively, disc-shaped contacts, and support members which reinforce the contacts. In the vacuum interrupter, one electrode rod is moved in the axial direction to bring a fixed-side contact and a movable-side contact into contact with each other or separate the fixed-side contact and the movable-side contact from each other, thereby performing current conduction or interruption.

Here, the coil electrodes are each an electrode which generates an axial magnetic field in the contacting/separating direction of the fixed-side contact and the movable-side contact as main electrodes. In addition, the coil electrode has a plurality of arc-shaped coil portions separated and disposed on the back side of each of both contacts in a circumferential direction along the outer edge of the contact. Furthermore, the coil electrode has an arm portion at one end of the coil in the axial direction, and has, at the other end thereof, a connection portion connected to the contact. In order to increase the interruption capacity of the vacuum interrupter, it is essential to develop the structures of the coil electrodes and the materials of the contacts, and various studies have been conducted. As a result, it has been found that the higher the intensity of the axial magnetic field generated by the coil electrode, the better the interruption performance of the vacuum interrupter.

The electrodes of Patent Document 1 include annular coil electrodes, contacts, and reinforcing components which reinforce the contacts. A movable-side electrode rod is connected to an operating mechanism provided to a switchgear body such as a vacuum circuit breaker, and both contacts are brought into contact with each other or separated from each other by moving the movable-side electrode rod in the axial direction, thereby performing current conduction or interruption. Each coil electrode is provided with a fitting portion at the center thereof, and is fixedly attached with the fitting portion fitted to a fitting portion of a fixed-side electrode rod or a fitting portion of the movable-side electrode rod. In addition, in order to generate an axial magnetic field in the contacting/separating direction of the contacts as main electrodes, a plurality of arc-shaped coil portions are separated and disposed on the back side of each of both contacts in a circumferential direction (circumferential direction along the outer edge of the contact). Each coil portion has an arm portion at one end thereof in the axial direction, and has, at the other end thereof, a power feeding portion which protrudes so as to come into contact with the contact. A slit is provided between the arm portion and the power feeding portion so as to divide the coil portions and correct the flow of a current. With this structure, the current flowing from the fixed-side electrode rod or the movable-side electrode rod passes through a path extending from the arm portion via the coil portion and passing through the power feeding portion, and is supplied to the contact via the power feeding portion.

In the above-described vacuum interrupter, a magnetic field in the axial direction of the vacuum interrupter (axial magnetic field) can be generated according to the right-handed screw rule by a current flowing through the coil portions in the circumferential direction.

CITATION LIST

Patent Document

Patent Document 1: Japanese Laid-Open Patent Publication No. 2002-150902

SUMMARY OF THE INVENTION

Problems to be Solved by the Invention

In the vacuum interrupter of Patent Document 1, by a current flowing through the coil portions in the circumferential direction, the magnetic field is intensified in a region of the contact portion (hereinafter, sometimes referred to as "axial magnetic field generation region") corresponding to each region surrounded by the arm portion and the coil portion, so that the required axial magnetic field intensity can be ensured. Meanwhile, as for the contact portion other than the axial magnetic field generation region, there is a problem that the shape of the coil electrode for improving the axial magnetic field intensity has not been sufficiently studied. As a result, for example, an effective axial magnetic field intensity cannot be ensured at a center portion of the contact portion, portions of the contact portion located above each arm portion, each power feeding portion, and the like.

The present disclosure has been made to solve the above problem, and an object of the present disclosure is to provide a vacuum interrupter capable of improving an axial magnetic field intensity even at a contact portion other than the above axial magnetic field generation region.

Solution to the Problems

A vacuum interrupter according to the present disclosure is a vacuum interrupter comprising: a fixed-side electrode rod which is fixed to one end portion of a container having a bottomed cylindrical shape; a movable-side electrode rod which is movably provided at another end portion of the container; a coil electrode which is provided at each of opposed ends of both electrode rods, which are the movable-side electrode rod and the fixed-side electrode rod, and generates a magnetic field in an axial direction, which is a direction along an axis of both electrode rods, by current conduction; and a contact portion which is provided on an opposed side of each coil electrode, wherein each coil electrode includes a ring portion which is concentrically fixed to a corresponding one of both electrode rods, a plurality of first coil portions which are disposed so as to be spaced apart from each other in a circumferential direction of the coil electrode by slits, a plurality of power feeding portions which are provided at end portions of the plurality of first coil portions, respectively, and at least one bypass portion which is provided so as to correspond to at least one of the plurality of first coil portions and connects the corresponding first coil portion and the ring portion, and the at least one bypass portion has a second coil portion which extends so as to have an overlap with the corresponding first coil portion and the power feeding portion opposed to the first coil portion, in the circumferential direction, a first arm portion which connects the second coil portion and the ring portion, and a second arm portion which connects the second coil portion and the first coil portion.

Effect of the Invention

In the vacuum interrupter according to the present disclosure, it is possible to improve the axial magnetic field intensity even at the contact portion other than the above axial magnetic field generation region.

DESCRIPTION OF EMBODIMENTS

Figure 1:
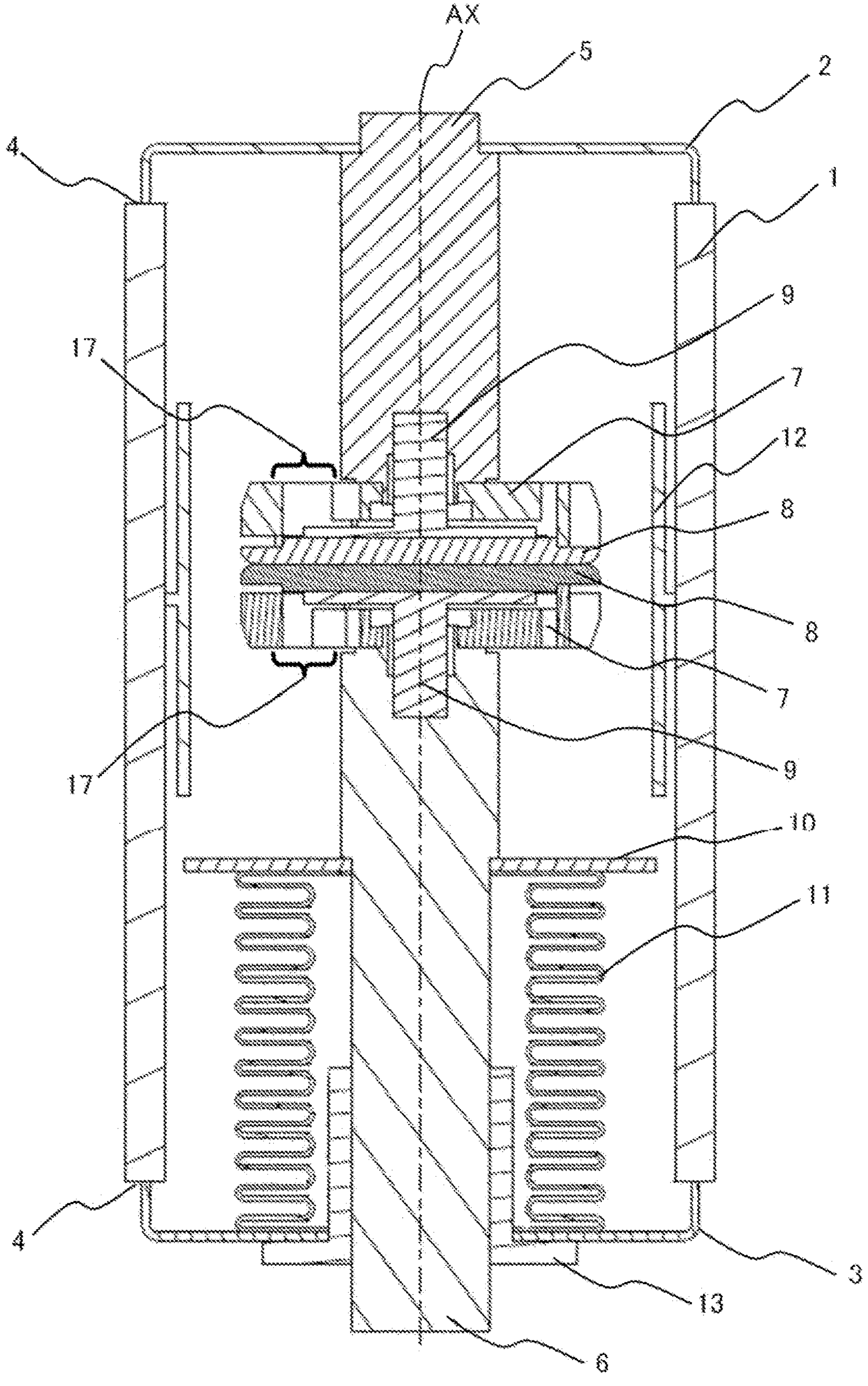
FIG. 1 is a schematic cross-sectional view showing the structure of a vacuum interrupter according to Embodiment 1.

Hereinafter, the vacuum interrupter according to the present disclosure will be described with reference to the drawings. In the description of the following embodiments, the same or corresponding parts in the drawings are designated by the same reference characters, and the description thereof is not repeated.

Hereinafter, as for the "circumferential direction" and the "radial direction", a description will be given with a direction along the outer edge of a contact portion as the "circumferential direction" and with a direction from the center of the contact portion toward the outer edge of the contact portion as the "radial direction". In the "circumferential direction", the direction from a first coil portion toward a power feeding portion opposed thereto across a slit is sometimes referred to as a "first direction" (clockwise direction in FIG. 3), and the direction opposite to the "first direction" is sometimes referred to as a "second direction" (counterclockwise direction in FIG. 3).

Here, when the "inner side" and the "outer side" in the "radial direction" are described, a description will be given with the case of being closer to the center of the contact portion in the radial direction than a reference point, as an "inner side". In addition, the case of being farther away from the center of the contact portion in the radial direction than the reference point is referred to as an "outer side".

Furthermore, the direction in which a movable-side electrode rod or a fixed-side electrode rod extends is referred to as an "axial direction". The side close to the opposed side of both electrodes is referred to as a front side, and the side opposite thereto, that is, the side close to the electrode rod, is referred to as a back side.

Embodiment 1

Figure 2:
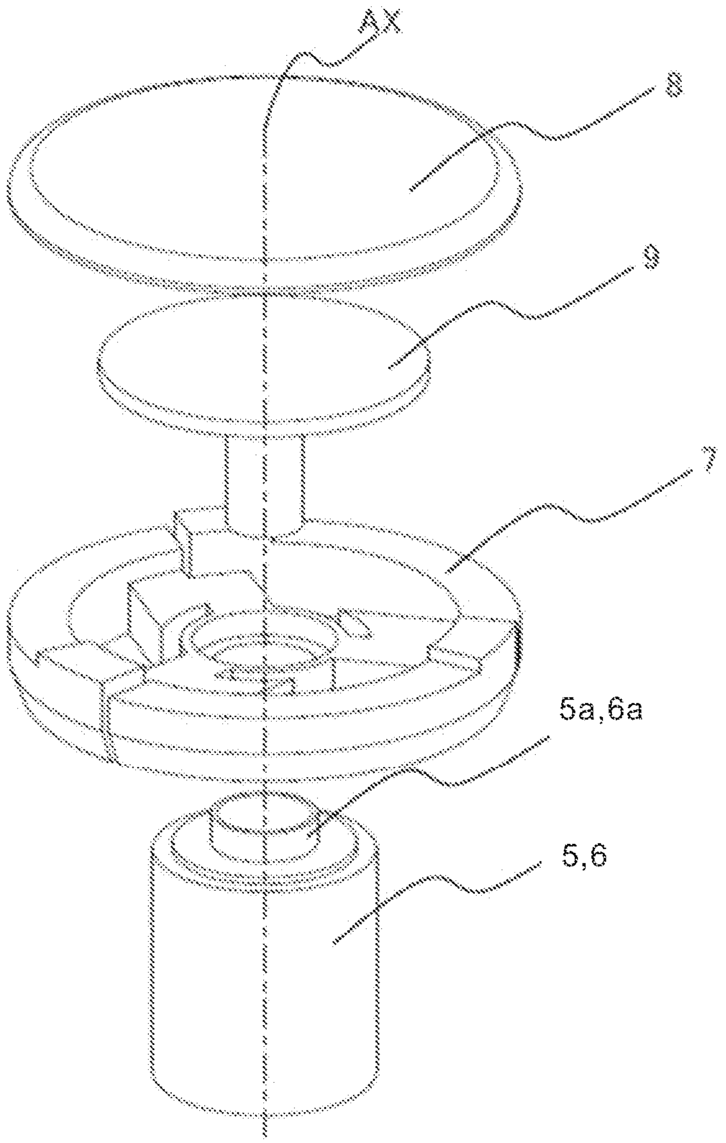
FIG. 2 is an exploded perspective view showing the configuration of an electrode structure of the vacuum interrupter according to Embodiment 1.
Figure 3:
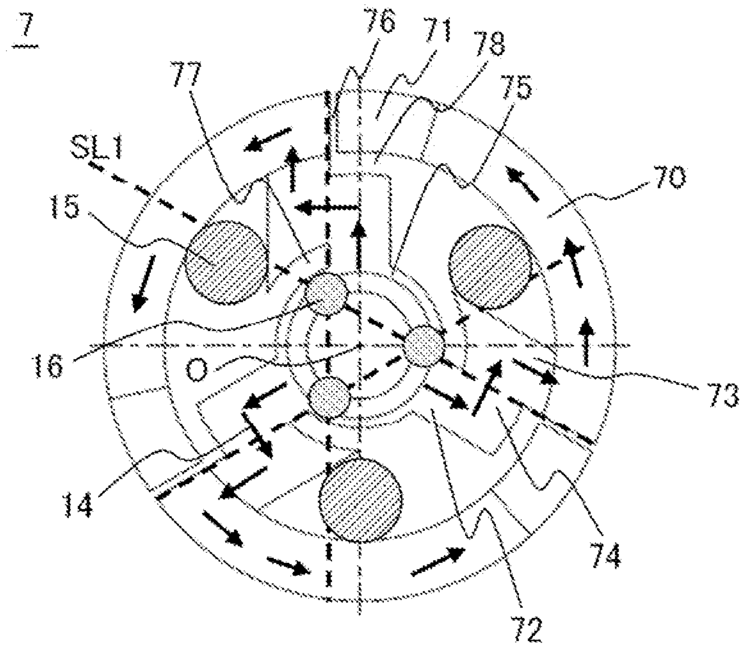
FIG. 3 is a schematic front view showing the electrode structure of the vacuum interrupter according to Embodiment 1.

Hereinafter, the configuration of a vacuum interrupter according to Embodiment 1 will be briefly described with reference to FIG. 1 to FIG. 3. FIG. 1 is a schematic cross-sectional view showing the structure of the vacuum interrupter according to Embodiment 1. FIG. 2 is an exploded perspective view showing the configuration of an electrode structure of the vacuum interrupter according to Embodiment 1. FIG. 3 is a schematic front view showing the electrode structure of the vacuum interrupter according to Embodiment 1.

First, the entire configuration of the vacuum interrupter will be briefly described with reference to FIG. 1 and FIG. 2.

As shown in FIG. 1, in the vacuum interrupter, a vacuum container is composed of an insulation cylinder 1 which has a bottomed cylindrical shape and is made of an insulating material such as alumina ceramic or glass, a fixed-side flange 2 which covers one end opening of the insulation cylinder 1, and a movable-side flange 3 which covers the other end opening of the insulation cylinder 1. The fixed-side flange 2 and the movable-side flange 3 are made of metal such as stainless steel.

Each of the fixed-side flange 2 and the movable-side flange 3 is coaxially attached to an end face of the insulation cylinder 1 by vacuum brazing. In the drawing, metallization layers 4 are formed on both ends of the insulation cylinder 1, and the fixed-side flange 2 and the movable-side flange 3 are connected to the metallization layers 4, respectively. A fixed-side electrode rod 5 is joined to the fixed-side flange 2 by brazing, and a fixed-side contact portion 8 is connected inside the container. Meanwhile, a movable-side electrode rod 6 is joined to the movable-side flange 3 via a bellows 11 by brazing, and a movable-side contact portion 8 is joined inside the container by brazing. In other words, the fixed-side electrode rod 5 is fixed to one end portion of a container (insulation cylinder 1) having a bottomed cylindrical shape. The movable-side electrode rod 6 which is movably disposed is provided at another end portion of the contact portion 8. An annular coil electrode 7 is provided at each of opposed ends of the fixed-side electrode rod 5 and the movable-side electrode rod 6. The contact portions 8 are provided on the opposed side of the coil electrodes 7. The fixed-side contact portion 8 and the movable-side contact portion 8 are disposed so as to be opposed to each other.

Umbrella-shaped reinforcing components 9 for reinforcing the contact portions 8 are provided between the coil electrodes 7 and the contact portions 8, respectively. The reinforcing components 9 are provided to the fixed-side electrode rod 5 and the movable-side electrode rod 6, respectively. Each contact portion 8 is reinforced by fixedly attaching the reinforcing component 9 thereto. A guide portion 13 for the movable-side electrode rod 6 is attached to the movable-side flange 3. The guide portion 13 serves as a bearing for the purpose of smooth movement of the movable-side electrode rod 6 on an axis AX.

At the upper end of the bellows 11, a bellows cover 10 is joined and disposed on the movable-side electrode rod 6 by brazing. The bellows cover 10 is provided for the purpose of preventing the bellows 11 from being stained or damaged due to an arc generated at the time of current interruption.

An arc shield 12 is disposed so as to surround both contact portions 8. The arc shield 12 inhibits metal vapor generated between both contact portions 8 at the time of current interruption, from adhering to the inner surface of the insulation cylinder 1.

Between both contact portions 8, an axial magnetic field is generated in a direction along the axis AX of both electrode rods 5 and 6 by current conduction.

As shown in FIG. 2, fitting portions 5*a* and 6*a* to which the coil electrodes 7 described later are fitted are provided in the fixed-side electrode rod 5 and the movable-side electrode rod 6, respectively, and the fixed-side electrode rod 5 and the movable-side electrode rod 6 are fixedly attached with the coil electrodes 7 fitted thereto.

Here, the structure of each coil electrode 7 will be described in detail with reference to FIG. 3 in addition to FIG. 2. As shown in FIG. 3, the coil electrode 7 has a first coil portion 70, a power feeding portion 71, a ring portion 75, and a bypass portion. The bypass portion includes a first arm portion 72, a second arm portion 73, and a second coil portion 74. A plurality of bypass portions are provided so as to correspond to a plurality of first coil portions 70, respectively. Each of the plurality of bypass portions connects the ring portion 75 and the first coil portion 70 corresponding to the bypass portion.

The coil electrodes 7 are concentrically fixed to both electrode rods 5 and 6 by the ring portions 75, respectively. The plurality of first coil portions 70 are disposed so as to be spaced apart from each other in the circumferential direction of the coil electrode 7 by slits 76. The power feeding portion 71 is provided at one end portion of each of the plurality of first coil portions 70.

The plurality of first coil portions 70 are disposed so as to be spaced apart from each other in the circumferential direction by the slits 76. In FIG. 3, each first coil portion 70 is shown in an arc shape, but the shape of each first coil portion 70 is not limited to the arc shape, and it is sufficient that each first coil portion 70 extends in the circumferential direction.

A plurality of power feeding portions 71 are provided at end portions of the plurality of first coil portions 70, respectively, and are electrically connected to the contact portion 8. Each power feeding portion 71 has a portion which protrudes so as to come into contact with the contact portion 8.

The ring portion 75 of the coil electrode 7 is fitted to the fitting portion 5*a* of the fixed-side electrode rod 5 or the fitting portion 6*a* of the movable-side electrode rod 6.

The first arm portion 72 is connected to another end portion of each first coil portion 70. The first arm portion 72 extends inward in the radial direction from the other end portion in the circumferential direction of the first coil portion 70. More specifically, a plurality of first arm portions 72 are provided so as to correspond to the plurality of first coil portions 70, respectively, and extend inward in the radial direction from the other end portions in the circumferential direction of the corresponding first coil portions 70.

The second arm portion 73 has one end portion connected to the ring portion 75. The second arm portion 73 extends outward in the radial direction from this one end portion toward another end portion thereof. The ring portion 75 is concentrically fixed to the electrode rod 5 or 6.

The second coil portion 74 has one end portion connected to the first arm portion 72, and another end portion connected to the second arm portion 73. The second coil portion 74 has a region (overlap region) extending in the circumferential direction, between the one end portion and the other end portion thereof. In other words, a plurality of second arm portions 73 are provided so as to correspond to the plurality of first arm portions 72, respectively, are connected to the ring portion 75, and extend outward in the radial direction.

The second coil portion 74 is provided so as to extend in the first direction (counterclockwise) in the circumferential direction from the first coil portion 70 toward the power feeding portion 71. In other words, a plurality of second coil portions 74 each extend in the circumferential direction so as to have an overlap with a corresponding first coil portion 70 among the plurality of first coil portions 70 and the power feeding portion 71 opposed to the first coil portion 70 across the slit 76.

Here, an example of a method for forming the first arm portion 72, the second arm portion 73, and the second coil portion 74 will be described in detail below. The first arm portion 72, the second arm portion 73, and the second coil portion 74 are formed by providing a first cutout 77 and a second cutout 78 in a member extending in the radial direction between: the first coil portion 70 and the power feeding portion 71; and the ring portion 75. Here, the first cutout 77 is, for example, an arc-shaped cutout provided along the ring portion 75. The second cutout 78 is, for example, an arc-shaped cutout provided along the power feeding portion 71.

In other words, the first cutout 77 is formed in an arc shape along the circumferential direction at the ring portion 75 between the second coil portion 74 and the ring portion 75. The second cutout 78 is formed in an arc shape along the circumferential direction at the first coil portion 70 and the power feeding portion 71 between the second coil portion 74 and the first coil portion 70.

The shapes of the first cutout 77 and the second cutout 78 are examples, and are not limited to the above-described examples. It is needless to say that the above-described forming method is one example. It is sufficient that the second coil portion 74 extends so as to have an overlap with the first coil portion 70 and the power feeding portion 71 in the circumferential direction as described above. Owing to this configuration, even in a region of the contact portion in which a longitudinal magnetic field intensity is less likely to be generated in a comparative example described later, a longitudinal magnetic field can be generated by each second coil portion 74.

Each power feeding portion 71 of the coil electrode 7 fixed to the fixed-side electrode rod 5 is fixed to the fixed-side contact portion 8. Each power feeding portion 71 of the coil electrode 7 fixed to the movable-side electrode rod 6 is fixed to the movable-side contact portion 8.

Comparative Example

Figure 4:
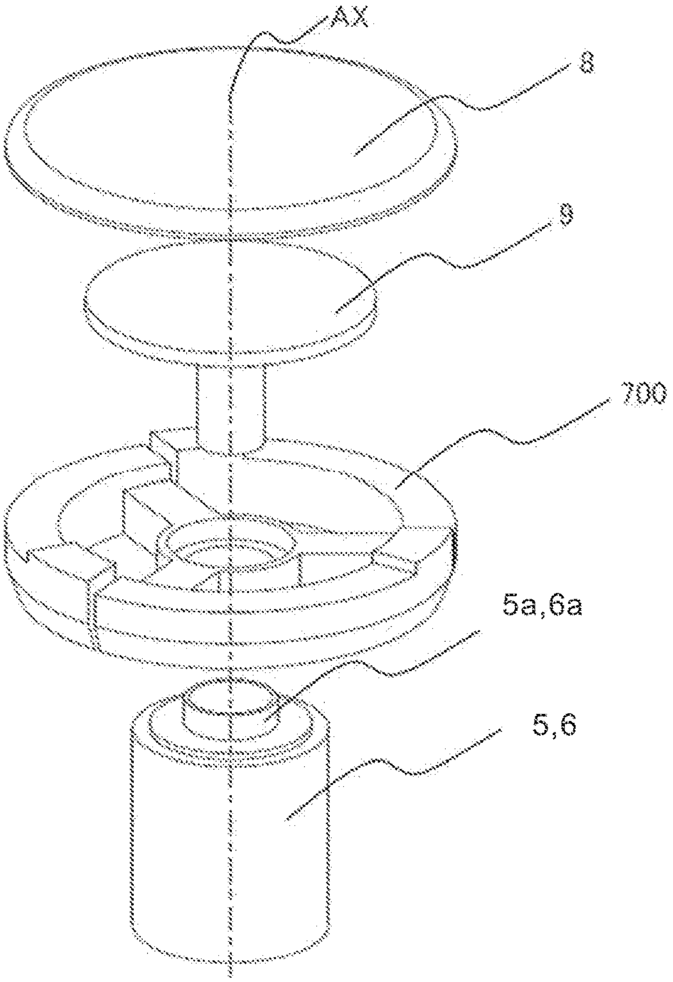
FIG. 4 is an exploded perspective view showing the configuration of an electrode structure according to a comparative example.
Figure 5:
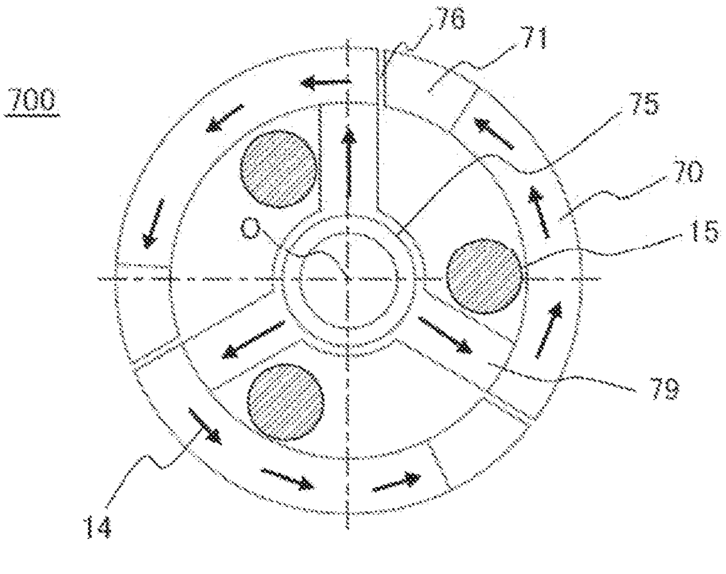
FIG. 5 is a schematic front view showing the electrode structure according to the comparative example.

Here, for describing the effects of each coil electrode 7 of the vacuum interrupter according to the present embodiment, a coil electrode 700 of a vacuum interrupter shown in FIG. 4 and FIG. 5 will be described as a comparative example. FIG. 4 and FIG. 5 are respectively an exploded perspective view and a schematic front view showing the configuration of an electrode structure according to the comparative example.

In the coil electrode 700 shown in FIG. 4 and FIG. 5, arm portions 79 extend outward in the radial direction from a ring portion 75, and each arm portion 79 is connected to one end portion of a first coil portion 70. Owing to this configuration, an axial magnetic field is intensified in a region of a contact portion (axial magnetic field generation region) corresponding to each region 15 which is a region surrounded by the first coil portion 70 and the arm portion 79.

In order to ensure an area having an effective magnetic flux density on the surface of the contact portion 8 other than the axial magnetic field generation region as described above, the following measures (1) to (3) can be adopted for the comparative example, but each of these measures has the following problems.

(1) In the case of increasing the diameters of the coil electrode and the contact portion 8,
 the increase in the diameters of the coil electrode and the contact portion 8 causes an increase in the diameter of the entire vacuum interrupter, resulting in a problem that the cost is increased.

(2) In the case of increasing a current density at the time of current conduction by decreasing the thickness of the coil portion,
 the resistance of the coil electrode itself is increased, resulting in a decrease in current conduction performance thereof. Furthermore, it is difficult to design heat dissipation of a switchgear body such as a vacuum circuit breaker to which the vacuum interrupter is attached.

(3) In the case of increasing a magnetic flux density around the center of the contact portion by using a magnetic material for the reinforcing component,
 trouble, such as heat generation at the time of current conduction and handling before and after a chemical treatment in a vacuum interrupter production process, arises.

In the vacuum interrupter according to the present embodiment, since each coil electrode 7 according to Embodiment 1 has the first arm portions 72, the second arm portions 73, and the second coil portions 74, the axial magnetic field is intensified even in the region surrounded by each second coil portion 74 and the ring portion 75.

As described in detail in the present embodiment and embodiments described below, an area having an effective magnetic flux density can be increased on the surface of the contact portion 8 without adopting the above measures (1) to (3).

The case where a current 14 is supplied from the fixed-side electrode rod 5 or the movable-side electrode rod 6 to the coil electrode 7 will be described below. As shown in FIG. 3, the current path of the current 14 supplied from the fixed-side electrode rod 5 or the movable-side electrode rod 6 is as follows. Specifically, as for the current path of the current 14, the current 14 is supplied to the contact portion 8 via each first arm portion 72, each second coil portion 74, each second arm portion 73, each first coil portion 70, and each power feeding portion 71.

By forming such a current path, the magnetic field at each location 15 surrounded by the second arm portion 73 and the first coil portion 70 is intensified according to the right-handed screw rule, so that the magnetic flux density is increased. Furthermore, there is an effect that the axial magnetic field is also increased on the inner side in the radial direction of each second coil portion 74 by the current flowing through each second coil portion 74.

As shown in FIG. 3, each first arm portion 72, each second arm portion 73, and each second coil portion 74 may be disposed so as to be parallel to each other, and the first arm portions 72 may be disposed so as to extend radially from the center of the coil electrode 7. In this case, in the drawing, as each reference line SL1, a line connecting an axial center O of the coil electrode 7 and a center portion in the circumferential direction of the first arm portion 72 can be set. Although described in detail later, the reference line SL1 is used for defining the positional relationship between the first arm portion 72, the second arm portion 73, and the second coil portion 74 in detail.

The magnetic field generated by the current flowing through each second coil portion 74 is strong on the reference line SL1 at the slit 76 on the inner side of the second coil portion 74, and the respective separated second coil portions 74 intensify the magnetic fields with respect to each other, in particular, at intersections 16 of the reference lines SL1 at the slits 76. Accordingly, an effect that the magnetic flux density is increased at the contact portion 8 including the intersections 16, is achieved.

Moreover, in order to effectively increase the area having an effective magnetic flux density, the positional relationship between the first coil portion 70, the second coil portion 74, and the power feeding portion 71 is important.

It is preferable to decrease the width of the overlap of the second coil portion 74 with the first coil portion 70 in the circumferential direction and increase the width of the overlap of the second coil portion 74 with the power feeding portion 71 in the circumferential direction. This is because the directions in which the current flows through the first coil portion 70 and the second coil portion 74 are the same and thus the magnetic fields are weakened with respect to each other according to the right-handed screw rule in the space between the first coil portion 70 and the second coil portion 74.

In the second coil portion 74, when W1 and W2 denote the width of the overlap of the second coil portion 74 with the first coil portion 70 in the circumferential direction and the width of the overlap of the second coil portion 74 with the power feeding portion 71 in the circumferential direction, respectively, the second coil portion 74 may be formed such that W2 is larger than W1. Accordingly, the weakening of the magnetic fields with respect to each other can be reduced, and as a result, the area having an effective magnetic flux density can be increased more efficiently. In addition, it is suitable that the second coil portion 74 overlaps the entirety of the power feeding portion 71 in the circumferential direction in the above. However, also in consideration of processability, the second coil portion 74 may be formed so as to extend in the first direction (corresponding to the clockwise direction in FIG. 3) in the circumferential direction longer than the power feeding portion 71 by larger than 0 mm and not larger than 5 mm.

Figure 6:
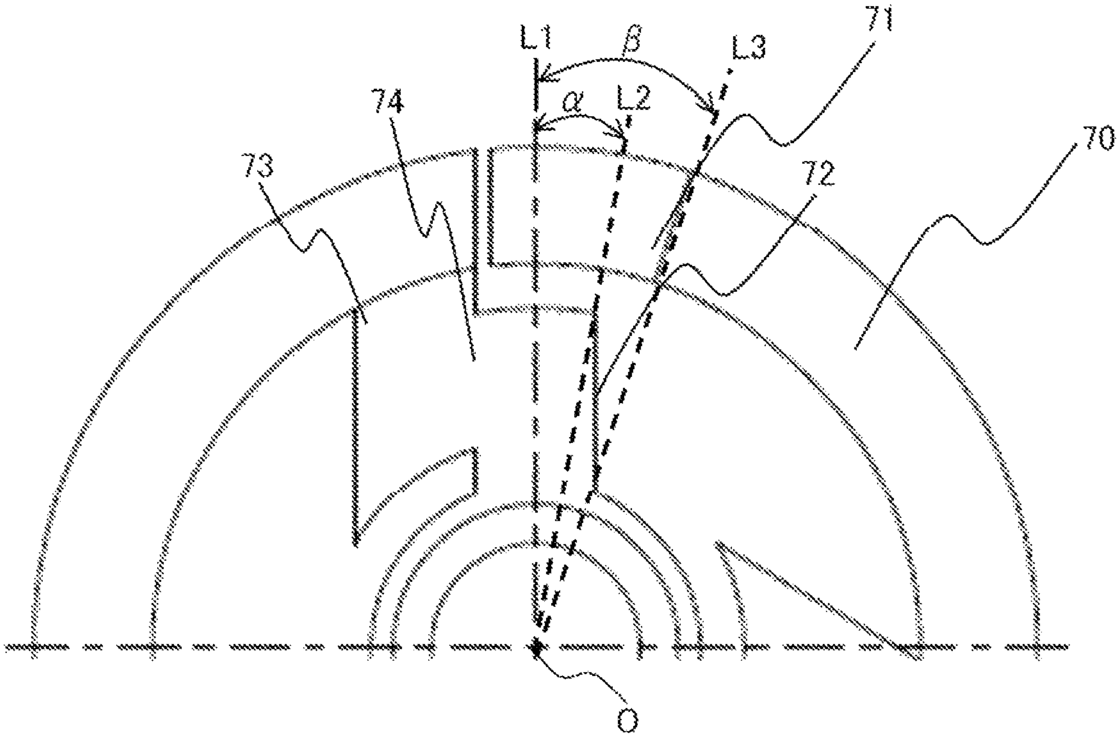
FIG. 6 is a schematic front view representing the dimensional relationship of a coil electrode of the vacuum interrupter according to Embodiment 1.

Here, the dimensional relationship of each component of the bypass portion will be described with reference to FIG. 6. That is, the dimensional relationship between the first arm portion 72, the second arm portion 73, and the second coil portion 74 will be described. In the drawing, similar to FIG. 3, the first arm portion 72 is extended radially from the center of the coil electrode 7.

For describing a first angle α and a second angle β, first, a line segment L1 to a line segment L3 will be described. The line segment L1 is a line segment connecting the center portion in the circumferential direction of the first arm portion 72 and the center (that is, the axial center O) of the coil electrode 7. The line segment L1 is provided so as to be parallel to the reference line SL1 shown in FIG. 3. Either the reference line SL1 or the line segment L1 may be used, but for the convenience of description, the line segment L1 is used below. The line segment L2 is a line segment connecting an inner end point in the radial direction of the second coil portion 74 and the axial center O of the coil electrode 7. The line segment L3 is a line segment connecting an end portion, of the power feeding portion 71, closer to the first coil portion 70 and the axial center O.

The first angle α is an angle formed between the line segment L1 (reference line SL1) and the line segment L2. The second angle β is an angle formed between the line segment L1 (reference line SL1) and the line segment L3. Ideally, the first angle α and the second angle β are preferably equal to each other. However, when manufacturing constraints such as processability and ease of assembly are taken into consideration, the first angle α and the second angle β are preferably set in the range of $$\beta-15^\circ \leq \alpha \leq \beta+15^\circ.$$

It is needless to say that the end of each portion in the first arm portion 72 may be rounded or tapered.

According to the present disclosure, the magnetic flux density is increased in each region 15 surrounded by the second arm portion 73 and the first coil portion 70, and the magnetic field generated by the current flowing through each second coil portion 74 acts. Since the magnetic flux density is increased even at each intersection region 16 on the extension of each slit 76 due to the above action, the number of locations where the magnetic flux density is increased is increased from that in the above comparative example (shown in FIG. 4 and FIG. 5). Therefore, the area having an effective magnetic flux density can be increased.

In addition, it is also possible to achieve the following effects as a result of the above effect that the area having an effective magnetic flux density can be increased. The uniformity of the magnetic field distribution can be improved by the above increase in the area having an effective magnetic flux density. In addition, the interruption performance can be stabilized by the improvement of the uniformity of the magnetic field distribution.

Moreover, as a result of the interruption performance being stabilized, it is also possible to interrupt a larger current. Accordingly, it is possible to contribute to an increase in the current of the vacuum interrupter. Furthermore, the increase in the area having an effective magnetic flux density promotes arc diffusion on the surface of the contact portion 8. As a result of the promotion of arc diffusion, thermal damage of the surface of the contact portion 8 can be reduced. Moreover, as a result of the reduction of thermal damage at the time of current interruption, the interruption life of the vacuum interrupter is also improved, so that the contact portion 8 can be prevented from being melted even when current interruption is performed a plurality of times. As a result, the vacuum interrupter can be configured to have a function of performing interruption a plurality of times.

Moreover, since the required area having an effective magnetic flux density can be ensured with a smaller diameter than that of the conventional coil electrode, the diameter of the coil electrode can be reduced. Furthermore, as the diameter of the coil electrode is reduced, the diameters of other components of the vacuum interrupter can also be reduced, which can contribute to reduction of the diameter and the weight of the entire vacuum interrupter. As a matter of course, by achieving the reduction of the diameter and the weight of the vacuum interrupter, the manufacturing cost can also be reduced.

Embodiment 2

Figure 7:
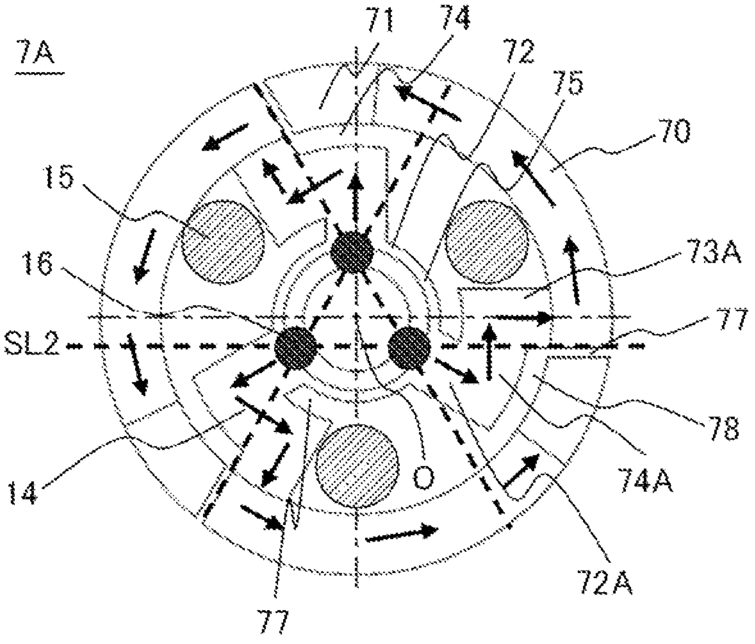
FIG. 7 is a schematic front view showing an electrode structure of a vacuum interrupter according to Embodiment 2.

Hereinafter, a configuration according to Embodiment 2 will be briefly described with reference to FIG. 7. FIG. 7 is a schematic front view showing a coil electrode 7A of a vacuum interrupter according to Embodiment 2.

In the coil electrode 7 of Embodiment 1, each first arm portion 72, each second arm portion 73, and each second coil portion 74 are parallel to each other, but as shown in FIG. 7, the coil electrode 7A according to the present embodiment is different from the coil electrode 7 according to Embodiment 1 in the following point. Specifically, the difference point is that each first arm portion 72A and each second arm portion 73A are not parallel to each other and the second arm portion 73A is disposed so as to have an angle with respect to the first arm portion 72A. The second arm portion 73A and a slit 76 are disposed so as to be parallel to each other, which is the same as in Embodiment 1.

In the present embodiment as well, the first arm portion 72A is disposed so as to extend radially from the center of the coil electrode 7A, so that a line connecting an axial center O of the coil electrode 7A and a center portion in the circumferential direction of the first arm portion 72A can be considered as a reference line SL2.

Also, here, similar to Embodiment 1, the case where the current 14 is supplied from the fixed-side electrode rod 5 or the movable-side electrode rod 6 to the coil electrode 7A is considered. As shown in FIG. 7, the current 14 supplied from the fixed-side electrode rod 5 or the movable-side electrode rod 6 passes through each first arm portion 72A, each second coil portion 74A, each second arm portion 73A, each first coil portion 70, and each power feeding portion 71 and is then supplied to the contact portion 8 via the power feeding portion 71. Since the current path is the same as in Embodiment 1, the magnetic field in each region 15 surrounded by the second arm portion 73A and the first coil portion 70 is intensified according to the right-handed screw rule, so that the magnetic flux density can be increased. Furthermore, an axial magnetic field can also be generated in a region on the inner side of each second coil portion 74A by the current flowing through each second coil portion 74A.

In Embodiment 1, since each first arm portion 72 and each second arm portion 73 are parallel to each other, the current 14 flows in the second coil portion 74 in a direction perpendicular to the first arm portion 72 after flowing through the first arm portion 72. On the other hand, in the present embodiment, since each first arm portion 72A and each second arm portion 73A are not parallel to each other, the current 14 having flowed through the first arm portion 72A flows in the second coil portion 74A in a direction perpendicular to the slit 76, not to the first arm portion 72A. The magnetic field generated by the current flowing through each second coil portion 74A is intensified on the extension of the slit 76 on the inner side of each second coil portion 74A, which is the same as in Embodiment 1. In addition, the separated second coil portions 74A intensify the magnetic fields with respect to each other at intersections 16 on the extensions of the slits 76, so that the magnetic flux density is increased, which is also the same as in Embodiment 1. Accordingly, when each second arm portion 73A is disposed such that the intersection 16 is located directly above the second arm portion 73A as shown in FIG. 7, the magnetic flux density of the longitudinal magnetic field can be increased even at a location where an axial magnetic field is less likely to be generated in the comparative example (shown in FIG. 5, etc.).

Moreover, as described in Embodiment 1, in order to efficiently increase the area having an effective magnetic flux density, the positional relationship between the second coil portion 74A, the first coil portion 70, and the power feeding portion 71 is important. Therefore, in the present embodiment as well, in order to more efficiently increase the area having an effective magnetic flux density, when an angle formed between the reference line SL2 and a straight line connecting the center of the coil electrode 7A and an end point of the second coil portion 74A is denoted by $\alpha$, and an angle formed between the reference line SL2 and a straight line connecting the right end of the power feeding portion 71 is denoted by $\beta$, the angles $\alpha$ and $\beta$ are preferably set in the range of $\beta-15°\leq\alpha\leq\beta+15°$ in consideration of constrains such as processability and ease of assembly. It is needless to say that the edge of each portion may be rounded or tapered in processing.

The vacuum interrupter according to Embodiment 2 has been described above. In the vacuum interrupter according to Embodiment 2, in addition to the effects of Embodiment 1, by disposing each second arm portion 73A so as to cross each first arm portion 72A, the effect that the magnetic flux density at a location where the magnetic field intensity is low, such as a location on each first arm portion 72A, can be increased is achieved.

Moreover, the number of locations where the magnetic flux density is increased is increased, so that, as a matter of course, the area having an effective magnetic flux density is increased, and in addition, the uniformity of the magnetic field distribution is further improved, and the interruption performance is stabilized. As a result of the interruption performance being stabilized, it is also possible to interrupt a larger current than in Embodiment 1, which can contribute to a further increase in the current of the vacuum interrupter. Similar to Embodiment 1, the increase in the area having an effective magnetic flux density promotes arc diffusion on the surface of the contact portion 8, so that thermal damage of the surface of the contact portion 8 is further reduced. Therefore, the interruption life is also improved, so that it is also possible to expand the range of application to multiple-time interruption specifications, etc.

Moreover, since the required area having an effective magnetic flux density can be ensured with a smaller diameter than that of the conventional coil electrode, the diameter of the coil electrode can be reduced. As the diameter of the coil electrode is reduced, the diameters of other components of the vacuum interrupter can also be reduced, which can also contribute to reduction of the diameter and the weight of the entire vacuum interrupter in the present embodiment. As a matter of course, achievement of the reduction of the diameter and the weight of the vacuum interrupter leads to cost reduction.

Embodiment 3

Figure 8:
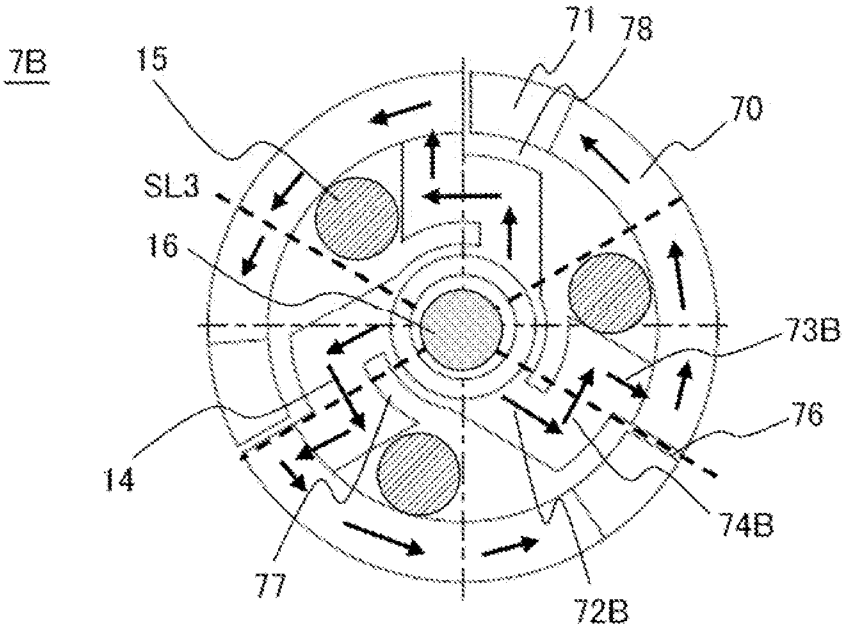
FIG. 8 is a schematic front view showing an electrode structure of a vacuum interrupter according to Embodiment 3.

Hereinafter, the configuration of a vacuum interrupter according to Embodiment 3 will be briefly described with reference to FIG. 8. FIG. 8 is a schematic front view showing a coil electrode 7B of the vacuum interrupter according to Embodiment 3.

In the coil electrode 7A of Embodiment 2, the reference line SL2 is set so as to pass through the center in the circumferential direction of the first arm portion 72. On the other hand, the coil electrode 7B according to the present embodiment is different from the above-described embodiments in that a reference line SL3 is set so as to pass through the center in the circumferential direction of a slit 76 and also pass through an axial center O of the coil electrode 7B.

Here, each slit 76 is provided at a position extended radially from the axial center O of the coil electrode 7B. In addition, each first arm portion 72B and each second arm portion 73B are provided so as to extend parallel to the direction in which the slit 76 extends.

According to the present embodiment, not only the magnetic flux density is increased in a region of the contact portion 8 corresponding to each region 15 surrounded by the second arm portion 73B and the first coil portion 70, but also the magnetic fields generated by the currents flowing through all separated second coil portions 74B are intensified with respect to each other at the center of the coil electrode 7B. By the intensification of the magnetic fields with respect to each other, the magnetic flux density on the surface of the contact portion 8 at the center of the coil electrode 7B is significantly improved. The maximum magnetic flux density on the surface of the contact portion 8 can be improved as compared to those in the coil electrode 7 and the coil electrode 7A according to the above-described embodiments.

In the present embodiment as well, since the number of locations where the magnetic flux density is increased can be increased, in addition to an increase in the area having an effective magnetic flux density, the uniformity of the magnetic field distribution is improved, and the interruption performance can be stabilized. As a result of the interruption performance being stabilized, it is also possible to interrupt a larger current, which can contribute to a further increase in the current of the vacuum interrupter. Similar to Embodiments 1 and 2, the increase in the area having an effective magnetic flux density promotes arc diffusion on the surface of the contact portion 8, so that thermal damage of the surface of the contact portion 8 is further reduced. Therefore, the interruption life is also improved, so that it is also possible to expand the range of application to multiple-time interruption specifications, etc.

Moreover, since the required area having an effective magnetic flux density can be ensured with a smaller diameter than that of the conventional coil electrode, the diameter of the coil electrode can be reduced. As the diameter of the coil electrode is reduced, the diameters of other components of the vacuum interrupter can also be reduced, which can also contribute to reduction of the diameter and the weight of the entire vacuum interrupter in the present embodiment. As a matter of course, achievement of the reduction of the diameter and the weight of the vacuum interrupter leads to cost reduction. An example of effects different from those of Embodiments 1 and 2 described above is expansion of the range of application to high-voltage specifications. Generally, when used under high voltage, it is necessary to increase the distance (inter-contact distance) between both contact portions 8 in order to reduce the electric field, but the magnetic flux density on the contact surface tends to decrease as the distance between the contacts is increased. By increasing the magnetic flux density using the present embodiment, the area having an effective magnetic flux density can be ensured even when the distance between the contacts is increased, so that it is possible to satisfy interruption performance.

The vacuum interrupter according to Embodiment 3 has been described above. In the vacuum interrupter according to Embodiment 3, in addition to the effects of Embodiments 1 and 2, the effect that the magnetic flux density at the contact portion 8 in the region corresponding to the center portion of the coil electrode 7B can be significantly increased is achieved.

Embodiment 4

Figure 9:
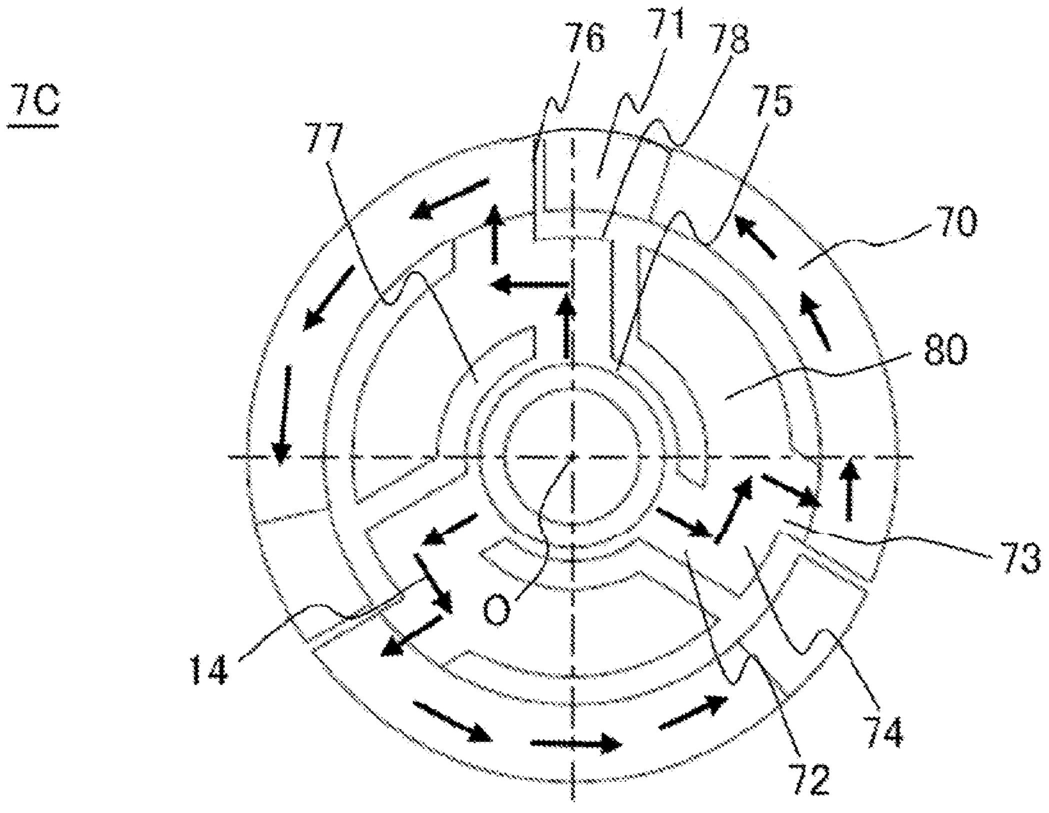
FIG. 9 is a schematic front view showing an electrode structure of a vacuum interrupter according to Embodiment 4.
Figure 10:
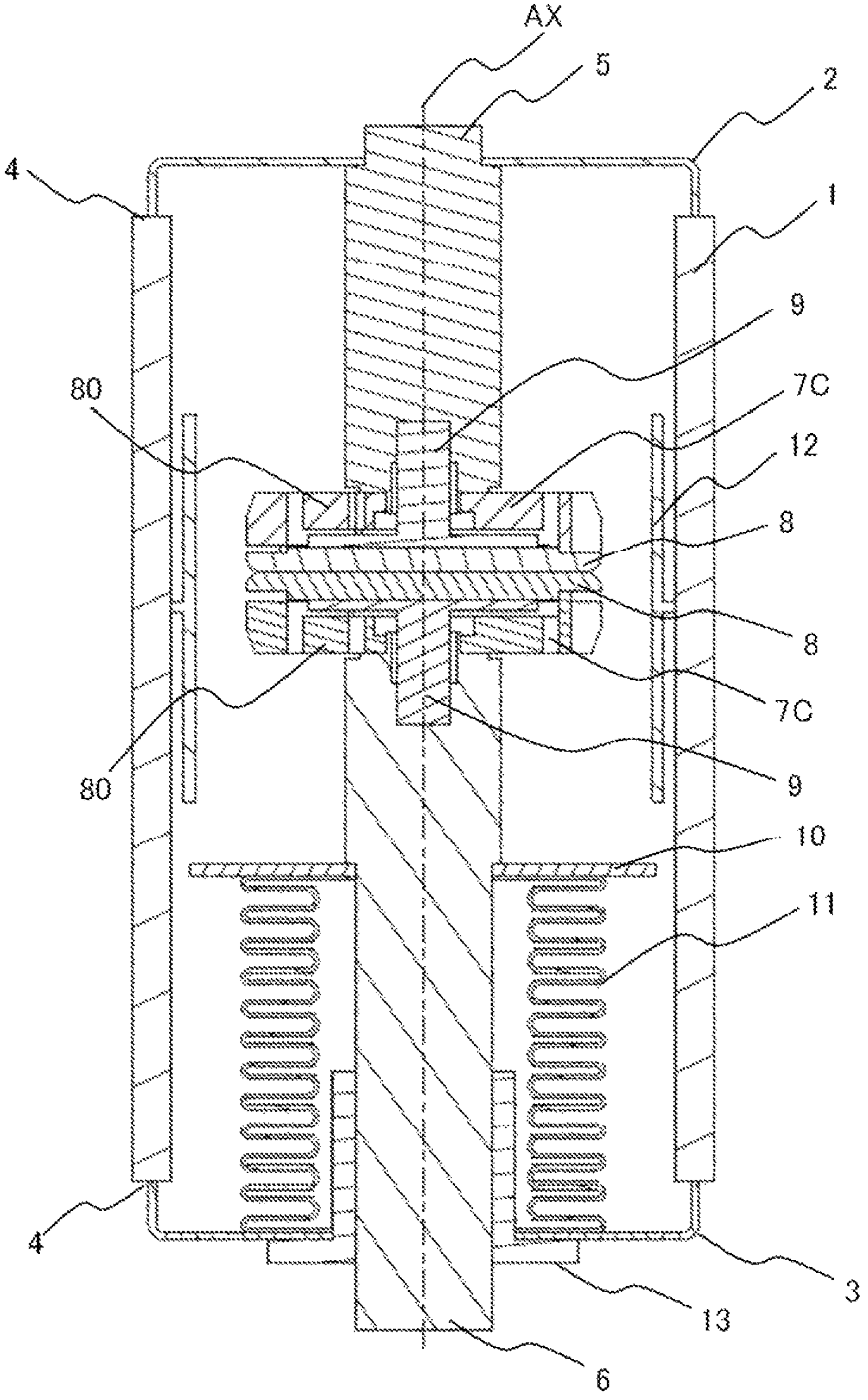
FIG. 10 is a schematic cross-sectional view showing the structure of the vacuum interrupter according to Embodiment 4.
Figure 11:
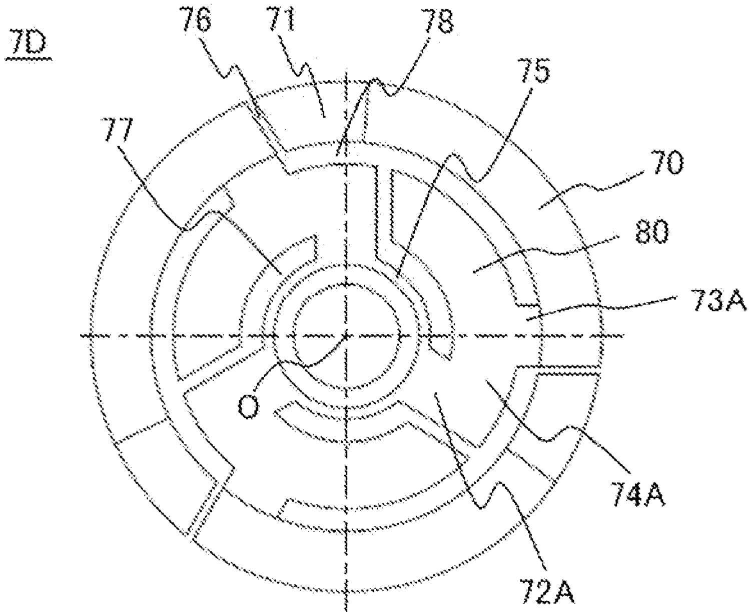
FIG. 11 is a schematic front view showing a first modification of the structure of the vacuum interrupter according to Embodiment 4.
Figure 12:
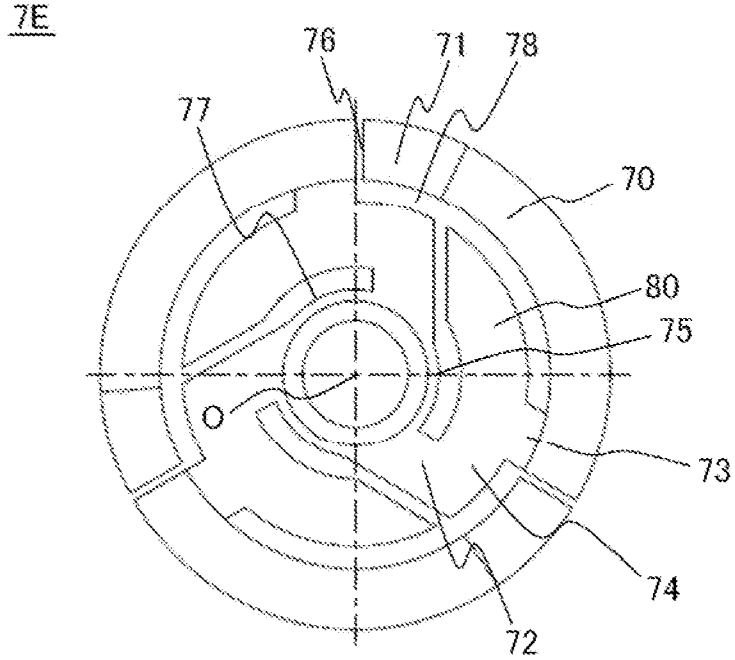
FIG. 12 is a schematic front view showing a second modification of the structure of the vacuum interrupter according to Embodiment 4.

Hereinafter, the configuration of a vacuum interrupter according to Embodiment 4 will be briefly described with reference to FIG. 9 to FIG. 12. FIG. 9 is a schematic front view showing a coil electrode 7C according to Embodiment 4. FIG. 10 is a schematic cross-sectional view showing the structure of the vacuum interrupter according to Embodiment 4. FIG. 11 is a schematic front view showing the structure of a coil electrode 7D (first modification) according to Embodiment 4. FIG. 12 is a schematic front view showing the structure of a coil electrode 7E (second modification) according to Embodiment 4.

The coil electrode 7C according to the present embodiment is different from the above-described embodiments in that, as shown in FIG. 9, an arc-shaped heat dissipation portion 80 is provided so as to extend in the circumferential direction from an end portion of each second coil portion 74. In other words, the heat dissipation portion 80 is provided so as to extend at each first cutout 77 in the second direction (counterclockwise) in the circumferential direction from one end portion, close to the first coil portion 70, of each second coil portion 74.

The heat generated when a current is conducted through each first arm portion 72, each second coil portion 74, and each second arm portion 73 can be dissipated by each heat dissipation portion 80. Accordingly, a rise in the temperatures of the first arm portion 72, the second coil portion 74, and the second arm portion 73 can be reduced, so that the current conduction performance of the coil electrode 7C can be improved.

Moreover, as shown in FIG. 1, since there is a void 17 at the back of each coil electrode 7, equipotential lines enter the voids 17 under high voltage, and the boundary electric field at the back of each coil electrode 7 becomes higher. On the other hand, by using the coil electrode 7C of the present embodiment in which the heat dissipation portions 80 are provided, the size of the void at the back of each coil electrode 7C is reduced as shown in FIG. 10, so that equipotential lines are less likely to enter the void. Accordingly, the boundary electric field at the back of each coil electrode 7C can be alleviated, and the voltage-withstanding performance can be improved.

As shown in FIG. 11, the coil electrode 7D may be one in which arc-shaped heat dissipation portions 80 are further provided to the coil electrode 7A. As in the coil electrode 7E shown in FIG. 12, arc-shaped heat dissipation portions 80 may be further provided to the coil electrode 7B. The heat dissipation portions 80 dissipate the heat generated in the coil electrode 7A, etc. The coil electrode is not limited to the above, and the coil electrode of any embodiment of the present disclosure may be used.

By providing the heat dissipation portions 80 to the coil electrode 7A, etc., the following can be achieved. Specifically, in addition to the effects of Embodiment 2 and Embodiment 3, the heat generated by current conduction through each first arm portion 72, each second coil portion 74, and each second arm portion 73 is dissipated at each heat dissipation portion 80. Since only a small amount of current is supplied to the heat dissipation portion 80, the amount of heat dissipated by the heat dissipation portion 80 is larger than the amount of heat generated in the heat dissipation portion 80, so that a rise in the temperature of the coil electrode 7A can be suppressed. Accordingly, the current conduction performance of the vacuum interrupter can be improved. In addition, by providing the heat dissipation portions 80, the boundary electric field at the back of the coil electrode 7A can be alleviated, and the voltage-withstanding performance of the vacuum interrupter can be improved.

The vacuum interrupter according to Embodiment 4 has been described above. In the vacuum interrupters according to Embodiment 4, in addition to the effects of the above-described embodiments, the effect that the above-described heat dissipation, the current conduction performance, etc., can be improved, is achieved.

Embodiment 5

Figure 13:
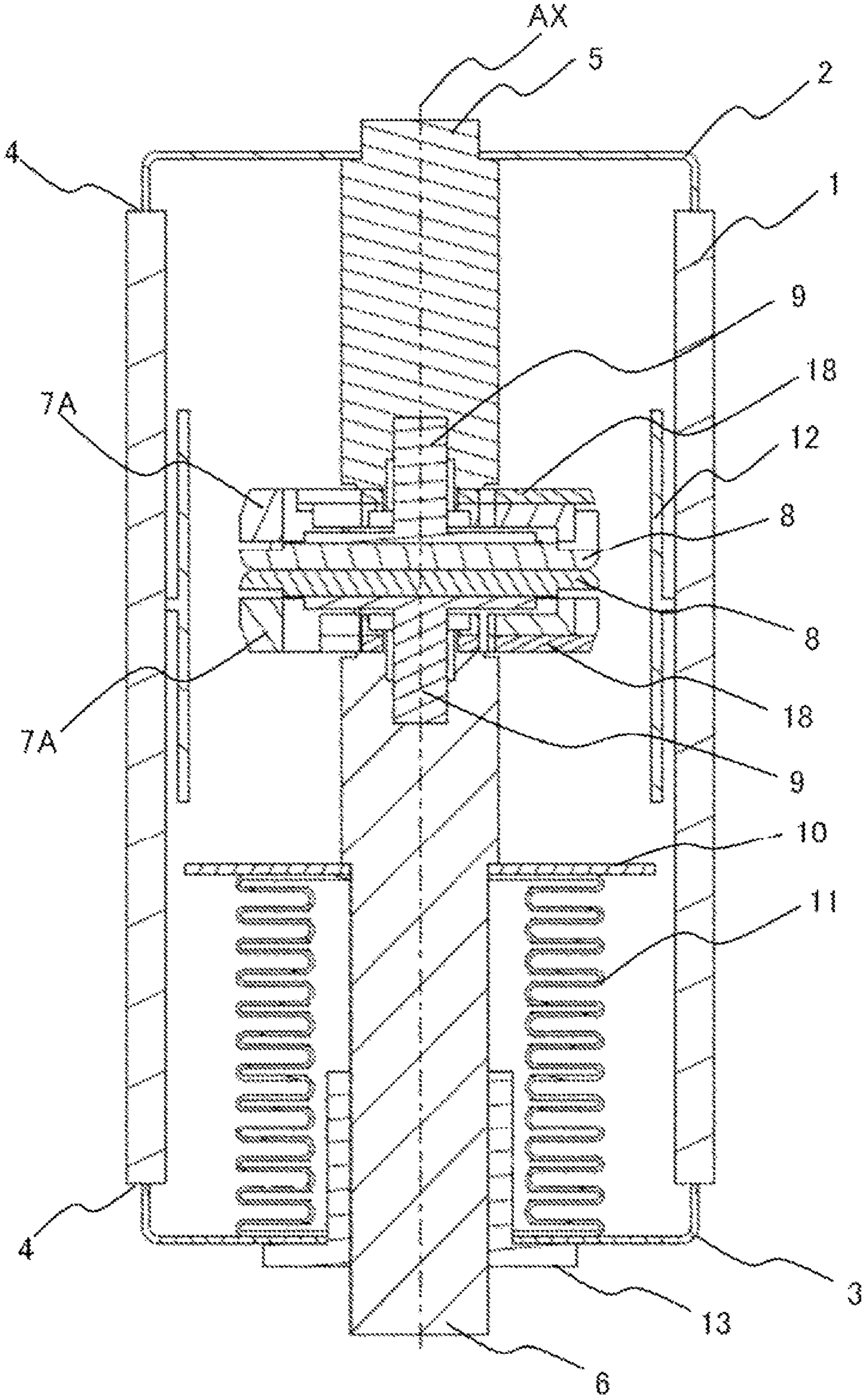
FIG. 13 is a schematic cross-sectional view showing the structure of a vacuum interrupter according to Embodiment 5.
Figure 14:
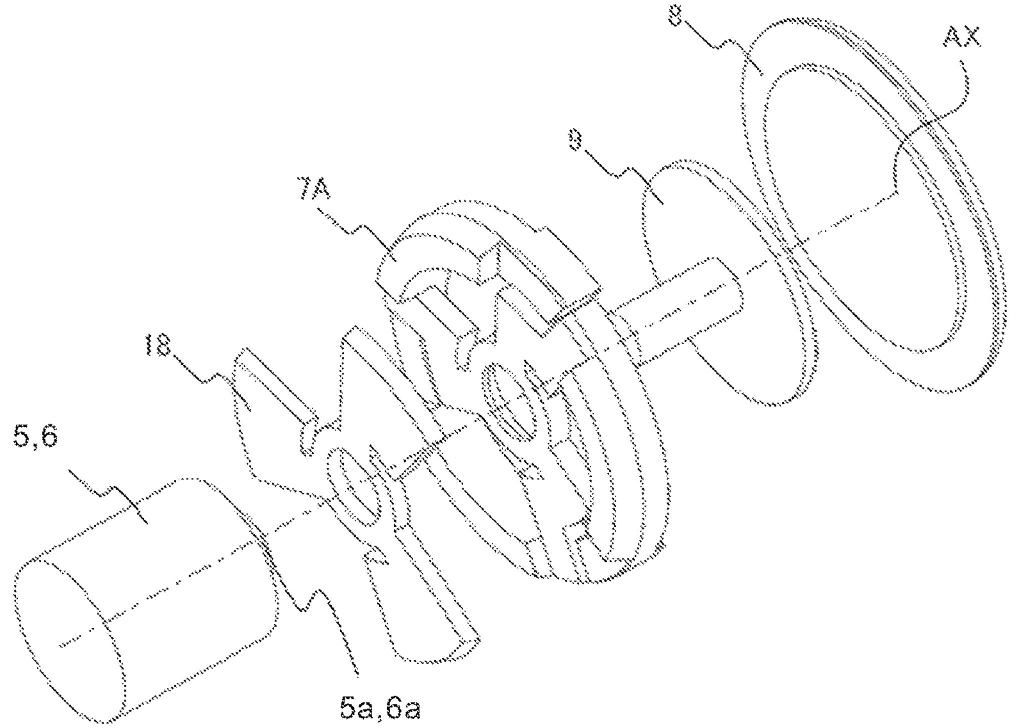
FIG. 14 is an exploded perspective view showing the configuration of an electrode structure of the vacuum interrupter according to Embodiment 5.
Figure 15:
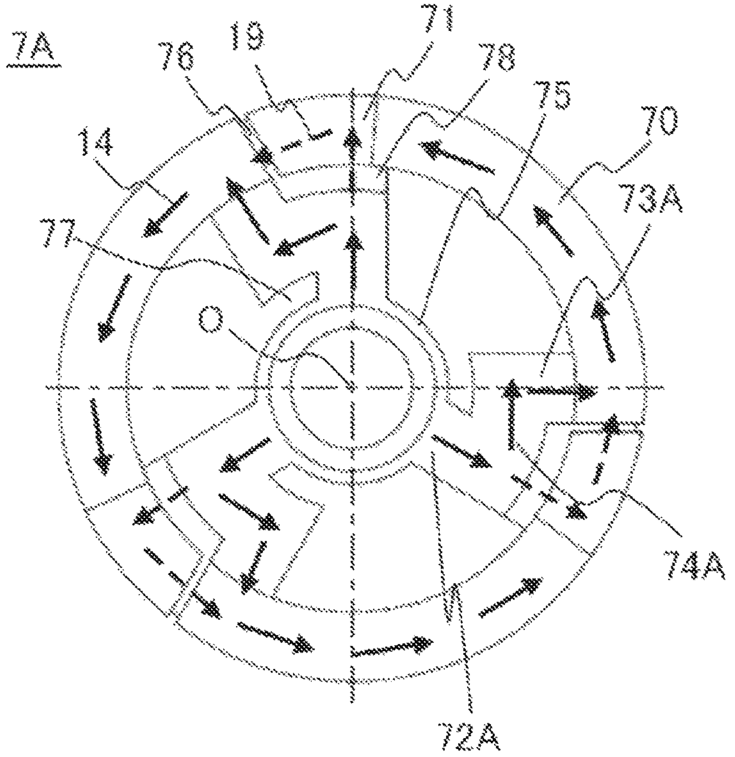
FIG. 15 is a schematic front view of a coil electrode of the vacuum interrupter according to Embodiment 5.
Figure 16:
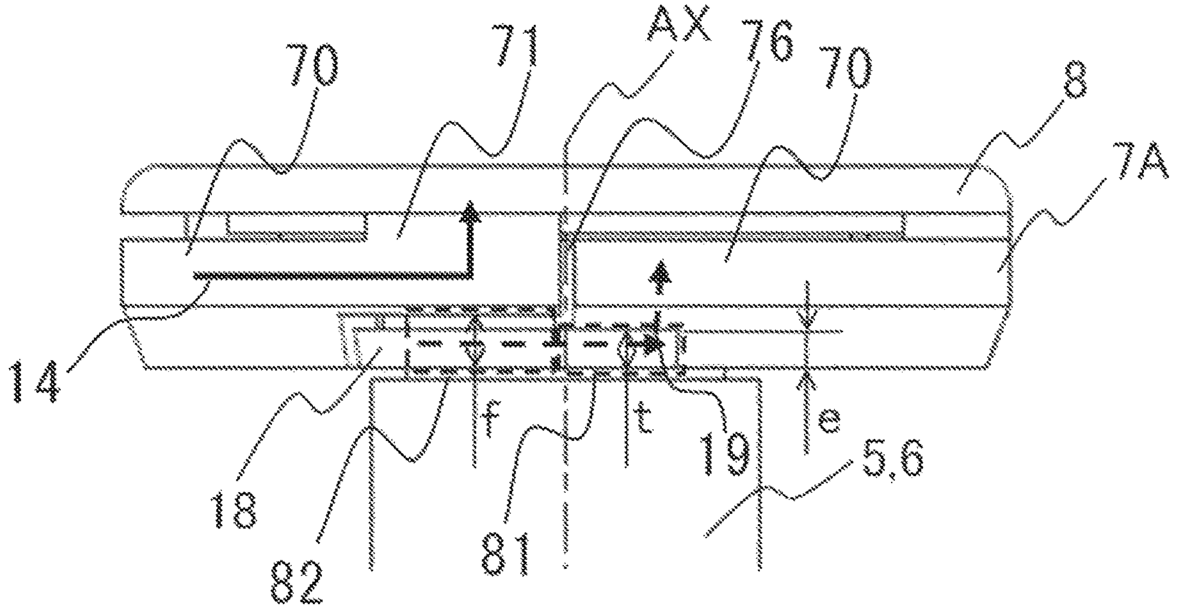
FIG. 16 is a schematic side view showing the electrode structure of the vacuum interrupter according to Embodiment 5.
Figure 17:
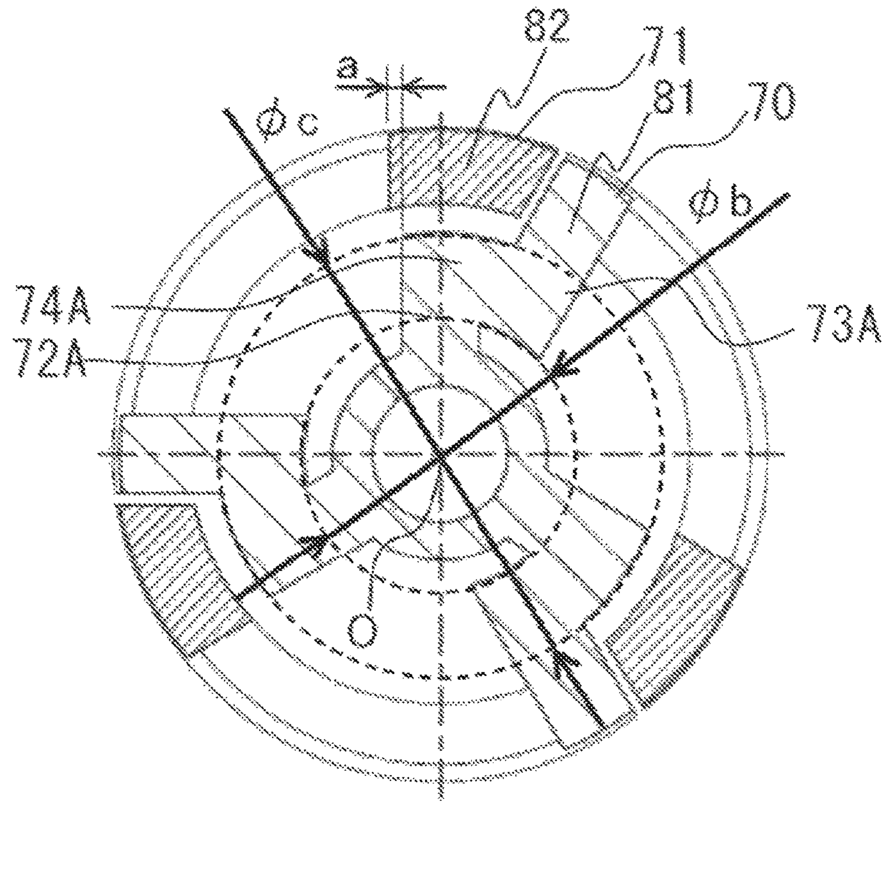
FIG. 17 is a schematic back view showing the coil electrode of the vacuum interrupter according to Embodiment 5.
Figure 18:
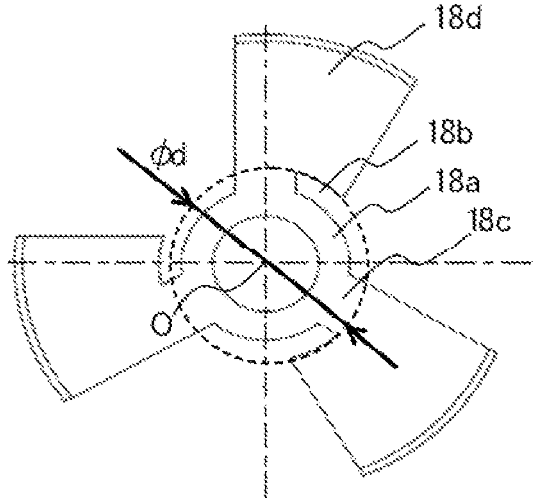
FIG. 18 is a schematic back view of a windmill plate of the vacuum interrupter according to Embodiment 5.
Figure 19:
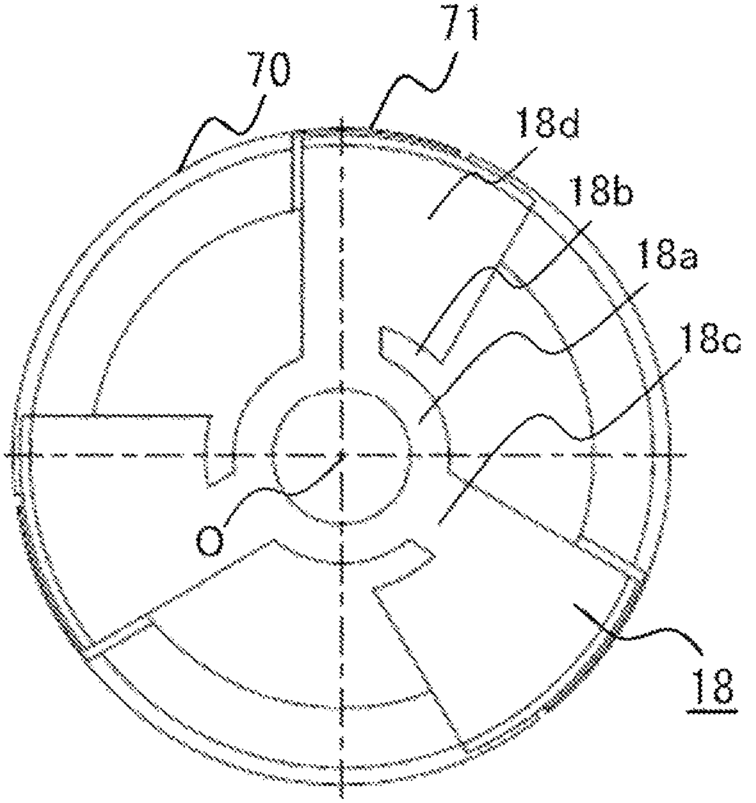
FIG. 19 illustrates a state where the windmill plate and the coil electrode of the vacuum interrupter according to Embodiment 5 are combined.

Hereinafter, the configuration of a vacuum interrupter according to Embodiment 5 will be briefly described with reference to FIG. 13 to FIG. 19. FIG. 13 is a schematic cross-sectional view showing the structure of the vacuum interrupter according to Embodiment 5. FIG. 14 is an exploded perspective view showing the configuration of an electrode structure of the vacuum interrupter according to Embodiment 5. FIG. 15 is a schematic front view of a coil electrode of the vacuum interrupter according to Embodiment 5. FIG. 16 is a schematic side view of the electrode structure of the vacuum interrupter according to Embodiment 5. FIG. 17 is a schematic back view showing the coil electrode of the vacuum interrupter according to Embodiment 5. FIG. 18 is a schematic back view of a windmill plate 18 of the vacuum interrupter according to Embodiment 5. FIG. 19 illustrates a state where the windmill plate 18 and the coil electrode 7A of the vacuum interrupter according to Embodiment 5 are combined.

As shown in FIG. 13 and FIG. 14, the vacuum interrupter according to the present embodiment is different from the above-described embodiments in having the windmill plate 18 (shown in FIGS. 13 and 14, etc.) provided on the back side of each coil electrode 7A. Although described in detail later, by providing the windmill plate 18, a leakage current flows to the back side of each power feeding portion 71, so that the intensity of the axial magnetic field around each power feeding portion 71 can be improved.

The basic structure of the coil electrode according to the present embodiment may be applied to any of the coil electrodes 7, 7A, 7B, 7C, 7D, and 7E of the above-described embodiments, but for convenience, the following description will be given using the coil electrode 7A of Embodiment 2.

Here, with reference to FIG. 15 and FIG. 16, a leakage current 19 (corresponding to dotted arrows in the drawings) flowing through the windmill plate 18 will be described. As described above, the current 14 supplied from the fixed-side electrode rod 5 or the movable-side electrode rod 6 passes through each first arm portion 72A, each second coil portion 74A, each second arm portion 73A, each first coil portion 70, and each power feeding portion 71 and is supplied to the contact portion 8. A part of the current 14 (solid arrow) flowing through each first arm portion 72A is diverted as the leakage current 19 (dotted arrow) to the windmill plate 18 on the back side.

The leakage current 19 flows from a portion, of the windmill plate 18, corresponding to each first arm portion 72A to a portion, of the windmill plate 18, corresponding to each power feeding portion 71, and then flows into the first coil portion 70 opposed thereto across the slit 76. Accordingly, when the leakage current 19 flows through the back side of each power feeding portion 71, an axial magnetic field is generated in each power feeding portion 71. As described above, the current is supplied from the fixed-side electrode rod 5 or the movable-side electrode rod 6 to the coil electrode 7A and the windmill plate 18.

Here, attachment of the windmill plate 18 and the coil electrode 7A will be specifically described. As shown in FIG. 16, a shallow groove 81 and a deep groove 82 are formed on the back surface of the coil electrode 7A. Here, when the depth of the shallow groove 81 in the axial direction is denoted by e, and the depth of the deep groove 82 in the axial direction is denoted by f, the shallow groove 81 and the deep groove 82 are formed such that a relationship of $e<f$ is satisfied as described above.

Due to the above-described relationship, the upper surface of the windmill plate 18 is in contact with the back surface of each first coil portion 70 on which the shallow groove 81 is formed. On the other hand, the upper surface of the windmill plate 18 is not in contact with the back surface of each power feeding portion 71 on which the deep groove 82 is formed.

A protruding portion is provided on the back side of each first coil portion 70, and thus the windmill plate 18 is connected to the protruding portion. Due to the connection between the windmill plate 18 and the protruding portion, the leakage current 19 flowing through the windmill plate 18 flows into the first coil portion 70. As described above, since the leakage current 19 flows in the circumferential direction at the windmill plate 18 on the back side of each power feeding portion 71, an axial magnetic field is generated in each power feeding portion 71.

Since the path of the current 14 is the same as in Embodiment 2, the magnetic flux density of the axial magnetic field is increased at the same locations as in Embodiment 2 according to the right-handed screw rule. In addition to the above embodiments, by the leakage current 19 flowing as described above, an axial magnetic field is generated in each power feeding portion 71. That is, the leakage current 19 flows through the windmill plate 18.

The range where the shallow groove 81 is formed is a range from the end face, at the slit 76, of each first coil portion 70 to the extension of each second arm portion 73, in addition to the ring portion 75, each first arm portion 72A, each second coil portion 74, and each second arm portion 73, as shown in FIG. 17. The deep groove 82 is formed from each power feeding portion 71 to each second coil portion 74. The shallow groove 81 is formed so as to have the same depth in the axial direction of both electrode rods 5 and 6. The deep groove 82 is also formed so as to have the same depth in the axial direction of both electrode rods 5 and 6.

FIG. 18 shows the windmill plate 18 corresponding to FIG. 17. The windmill plate 18 has a plurality of arc-shaped members disposed radially in the circumferential direction. The windmill plate 18 is connected to the electrode rod 5 or 6 by a windmill fitting portion 18*a*. Each arc-shaped member is provided with a windmill cutout 18*b* along the circumferential direction at the windmill fitting portion 18*a*. Since the windmill cutout 18*b* is formed in each of the plurality of arc-shaped members, the windmill plate 18 is formed so as to have the windmill fitting portion 18*a*, windmill arm portions 18*c*, and windmill coil portions 18*d*. The windmill plate 18 has the windmill fitting portion 18*a* which is fitted to the fitting portion 5*a* or 6*a* of the fixed-side electrode rod 5 or the movable-side electrode rod 6.

By fitting the windmill fitting portion 18*a* (FIG. 18) and the ring portion 75 (FIG. 7) to the fitting portion 5*a* or 6*a* (FIG. 14) of the fixed-side electrode rod 5 or the movable-side electrode rod 6, the coil electrode 7A and the windmill plate 18 are attached to the fixed-side electrode rod 5 or the movable-side electrode rod 6. Accordingly, as shown in FIG. 14, the windmill plate 18 is fixed and attached to the back surface of the coil electrode 7A.

The shallow groove 81 is formed on the back side of the coil electrode 7A. The shallow groove 81 is provided on the back side of each first coil portion 70, each second arm portion 73A, and each second coil portion 74A. Each windmill coil portion 18*d* is placed with a connection surface at the shallow groove 81 of the coil electrode 7A.

The setting of the dimensions of each cutout (first cutout 77, second cutout 78, windmill cutout 18*b*) will be described in detail with reference to FIG. 17 and FIG. 18. In FIG. 17, $\varphi b$ denotes the outer diameter of the first cutout 77, and $\varphi c$ denotes the inner diameter of the second cutout 78. In FIG. 18, $\varphi d$ denotes the outer diameter of the windmill cutout 18*b*.

Here, it is preferable to set the dimensions such that a relationship of $\varphi b \leq \varphi d < \varphi c$ is satisfied. Owing to this dimension setting, the width in the radial direction of each windmill coil portion 18*d* of the windmill plate 18 can be ensured, and a configuration in which a leakage current described later easily flows can be provided.

The deep groove 82 is formed so as to extend from one end portion on the slit 76 side of each power feeding portion 71 to another end portion thereof, and is formed so as to extend in the circumferential direction at the second coil portion 74A from the other end portion of the power feeding portion 71 by a dimension a. Here, the depth in the axial direction of the deep groove 82 is uniform. The dimension a (mm) preferably satisfies a relationship of 0<a≤5. Owing to this, by increasing the overlap between each windmill coil portion 18*d* of the windmill plate 18 and each second coil portion 74A in the circumferential direction, the longitudinal magnetic field around each power feeding portion 71 can be intensified. The direction in which the current flows through the windmill coil portion 18*d* of the windmill plate 18 and the direction in which the current flows through the second coil portion 74A are opposite to each other, and as a result, axial magnetic fields are intensified with respect to each other according to the right-handed screw rule.

Referring back to FIG. 16, the setting of dimensions for alleviating the boundary electric field at the back of the coil electrode 7A will be described. In this configuration, when the thickness in the axial direction of the windmill plate 18 is denoted by t, the depth e of the shallow groove 81 and the thickness t of the windmill plate 18 are preferably made equal to each other (e=t) in consideration of the boundary electric field at the back of the coil electrode 7A. On the other hand, in the case where the current conduction performance between the windmill plate 18 and the coil electrode 7A is prioritized, the depth e of the shallow groove 81 may be equal to or smaller than the thickness t of the windmill plate 18 (e≤t). In addition, basically, the outer diameter of the windmill plate 18 may be equal to the outer diameter of the coil electrode 7A. However, in consideration of electric field design, it is preferable to match the shape of the windmill plate 18 with the outer periphery shape of the coil electrode 7A as appropriate by, for example, rounding or tapering each end portion.

The vacuum interrupter according to Embodiment 5 has been described above. In the vacuum interrupter according to Embodiment 5, in addition to the effects of Embodiment 1, the effect that the longitudinal magnetic field around each power feeding portion 71 is increased by a leakage current flowing on the back side of each power feeding portion 71, is achieved.

Embodiment 6

Hereinafter, the configuration of a vacuum interrupter according to Embodiment 6 will be briefly described with reference to FIG. 20 to FIG. 23. The present embodiment is different from the vacuum interrupter according to Embodiment 5 in the shapes of the shallow groove 81 and the deep groove 82.

Figure 20:
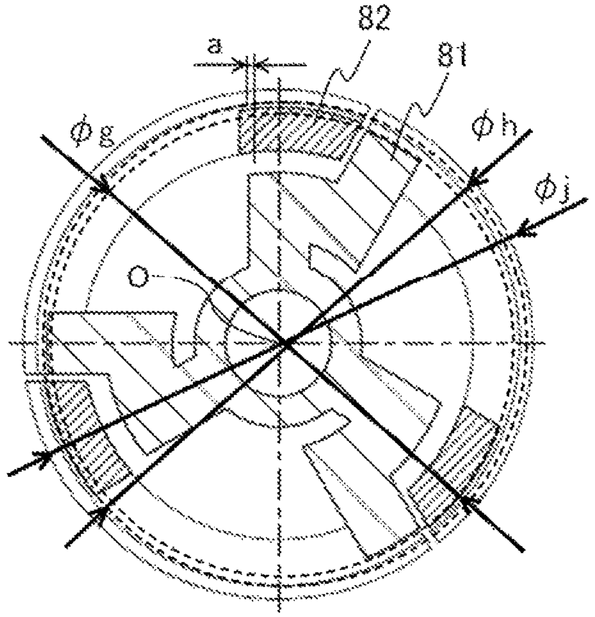
FIG. 20 is a schematic back view of a coil electrode of a vacuum interrupter according to Embodiment 6.
Figure 21:
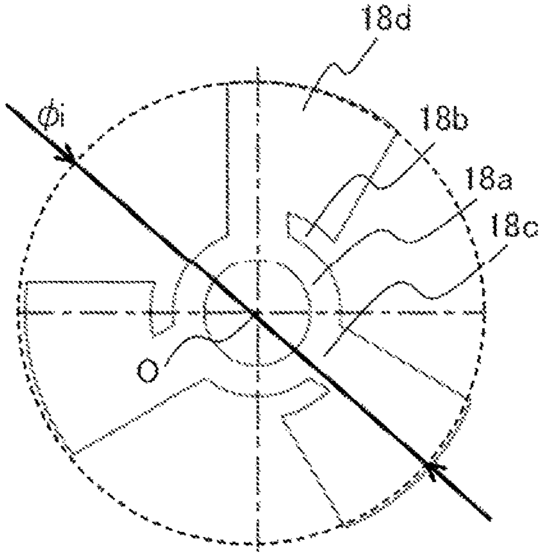
FIG. 21 is a schematic back view of a windmill plate according to Embodiment 6.
Figure 22:
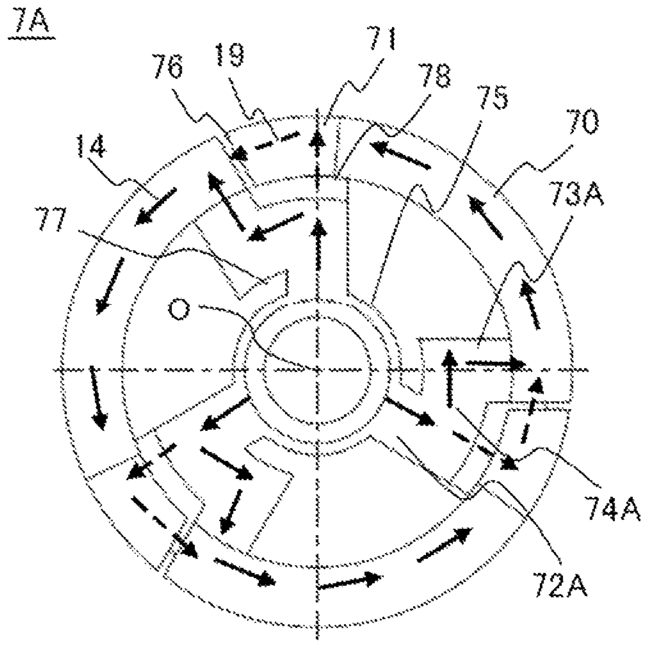
FIG. 22 is a schematic front view illustrating the flow of a current in the coil electrode of the vacuum interrupter according to Embodiment 6.
Figure 23:
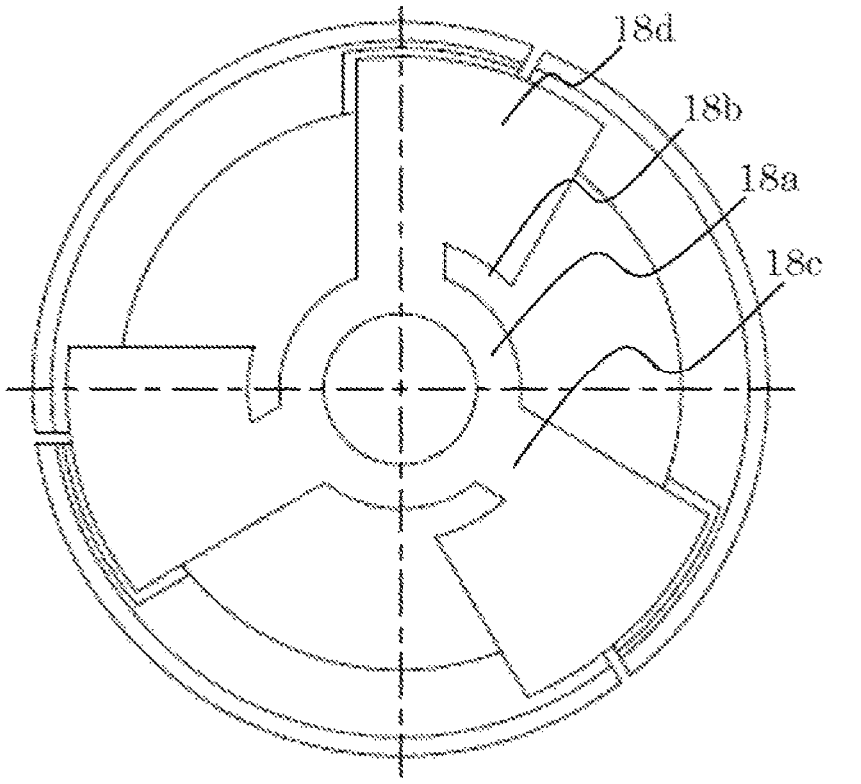
FIG. 23 is a schematic back view illustrating a state where the coil electrode and the windmill plate of the vacuum interrupter according to Embodiment 6 are combined.

FIG. 20 illustrates a state where the coil electrode 7A and the windmill plate 18 of the vacuum interrupter according to Embodiment 6 are combined. FIG. 21 is a schematic back view of the windmill plate 18 according to Embodiment 6. FIG. 22 is a schematic front view illustrating the flow of a current in the coil electrode of the vacuum interrupter according to Embodiment 6. FIG. 23 is a schematic back view illustrating a state where the coil electrode and the windmill plate 18 of the vacuum interrupter according to Embodiment 6 are combined.

In FIG. 20, similar to Embodiment 5, the deep groove 82 may be formed so as to extend from one end portion on the slit 76 side of each power feeding portion 71 to another end portion thereof, and is formed so as to extend in the circumferential direction at the second coil portion 74 from the other end portion of the power feeding portion 71 by a dimension a (dimension a (mm) preferably satisfies 0<a≤5).

Here, in FIG. 20 and FIG. 21, the outer diameters of the shallow groove 81 and the deep groove 82 formed in the coil electrode 7A are denoted by φg and φh, respectively. In addition, the outer diameter of the windmill plate 18 is denoted by (pi, and the outer diameter of the coil electrode 7A is denoted by φj. In the vacuum interrupter according to the present embodiment, the following dimension setting is different from that of the vacuum interrupter according to Embodiment 5. Specifically, the difference is that the dimensions are set such that φg<φh<φj and φg=φi are satisfied. In other words, the outer diameter φh of the deep groove 82 is larger than the outer diameter φg of the shallow groove 81 and smaller than the outer diameter φj of the coil electrode 7A. The coil electrode 7A (FIG. 20) and the windmill plate 18 (FIG. 21) are combined to form the configuration shown in FIG. 23, but owing to the above-described dimension setting, the area exposed from the side surface of the coil electrode 7A is decreased by the windmill plate 18, so that a decrease in the boundary electric field at the coil electrode 7A can be suppressed.

As shown in FIG. 22, in the present embodiment as well, similar to Embodiment 5, the intensity of the longitudinal magnetic field around each power feeding portion 71 is increased by the configuration in which the leakage current 19 flows.

In the coil electrode 7A of the windmill plate 18 according to Embodiment 5, there is an exposed portion from the side surface thereof (FIG. 16). On the other hand, in the present embodiment, the dimensions of the windmill plate 18 and the coil electrode 7A are set such that the windmill plate 18 decreases the area of the exposed portion. Accordingly, the gap between the coil electrode 7A and the windmill plate 18 can be reduced, and as a result, a decrease in the boundary electric field at the side surface of the coil electrode 7A can be suppressed.

The vacuum interrupter according to Embodiment 6 has been described above. In the vacuum interrupter according to Embodiment 6, in addition to the effects of Embodiment 5, the effect that the gap between the coil electrode 7A and the windmill plate 18 can be reduced by the windmill plate 18 decreasing the area exposed from the side surface of the coil electrode 7A, is achieved.

In the above-described embodiments, the case where the coil electrode is divided into three portions has been described, but the number of divisions of the coil electrode is not limited to three, and may be two or may be four or more. Although the plurality of bypass portions are provided so as to correspond to the plurality of first coil portions, respectively, at least one bypass portion may be disposed so as to correspond to a first coil portion.

The above-described embodiments may be combined with each other, or each of the embodiments may be modified or simplified as appropriate.

DESCRIPTION OF THE REFERENCE CHARACTERS

1 insulation cylinder
5 fixed-side electrode rod
6 movable-side electrode rod
5*a*, 6*a* fitting portion
7, 7A, 7B, 7C, 7D coil electrode
8 contact portion
18 windmill plate
18*a* windmill fitting portion
18*b* windmill cutout
18*c* windmill arm portion
18*d* windmill coil portion
70, 70A 70B, 70C, 70D first coil portion
71 power feeding portion
72, 72A, 72B first arm portion

73, 73A, 73B second arm portion
74, 74A, 74B second coil portion
75 ring portion
76 slit
77 first cutout
78 second cutout
80 heat dissipation portion
81 shallow groove
82 deep groove

The invention claimed is:

1. A vacuum interrupter comprising: a fixed-side electrode rod which is fixed to one end portion of a container having a bottomed cylindrical shape; a movable-side electrode rod which is movably provided at another end portion of the container; a coil electrode which is provided at each of opposed ends of both electrode rods, which are the movable-side electrode rod and the fixed-side electrode rod, and generates a magnetic field in an axial direction, which is a direction along an axis of both electrode rods, by current conduction; and a contact portion which is provided on an opposed side of each coil electrode, wherein
each coil electrode includes
a ring portion which is concentrically fixed to a corresponding one of both electrode rods,
a plurality of first coil portions which are disposed so as to be spaced apart from each other in a circumferential direction of the coil electrode by slits,
a plurality of power feeding portions which are provided at end portions of the plurality of first coil portions, respectively, and
at least one bypass portion which is provided so as to connect at least one corresponding first coil portion of the plurality of first coil portions and the ring portion so as to define a current path with a circumferential component between the corresponding first coil portion and the ring portion,
the at least one bypass portion has
a second coil portion which extends so as to have an overlap with the corresponding first coil portion and the power feeding portion opposed to the first coil portion, in the circumferential direction,
a first arm portion which connects the second coil portion and the ring portion, and
a second arm portion which connects the second coil portion and the first coil portion,
the at least one bypass portion is a plurality of bypass portions,
the first arm portion of each of the plurality of bypass portions is provided at a position extended radially from an axial center of the coil electrode, and
when: a line connecting the axial center of the coil electrode and a center portion in the circumferential direction of the first arm portion is defined as a reference line;
an angle formed between the reference line and a line connecting one end portion, close to the opposed power feeding portion, of the second coil portion and the axial center of the coil electrode is denoted by $\alpha$; and
an angle formed between the reference line and a line connecting an end portion, close to the first coil portion, of the opposed power feeding portion and the axial center of the coil electrode is denoted by $\beta$,
$\beta-15° \leq \alpha \leq \beta+15°$ is satisfied.

2. The vacuum interrupter according to claim 1, wherein at least either the first arm portion or the second arm portion is provided so as to extend in a radial direction of the coil electrode, parallel to a direction in which the slit extends.

3. The vacuum interrupter according to claim 1, wherein
a first cutout is formed between the second coil portion and the ring portion so as to extend in the circumferential direction along the ring portion, and
a second cutout is formed between the second coil portion and the first coil portion so as to extend in the circumferential direction along the first coil portion and the opposed power feeding portion.

4. The vacuum interrupter according to claim 1, wherein
each slit is provided at a position extended radially from the axial center of the coil electrode, and
the first arm portion and the second arm portion are provided so as to extend in the radial direction of the coil electrode, parallel to the direction in which the slit extends.

5. A vacuum interrupter comprising: a fixed-side electrode rod which is fixed to one end portion of a container having a bottomed cylindrical shape; a movable-side electrode rod which is movably provided at another end portion of the container; a coil electrode which is provided at each of opposed ends of both electrode rods, which are the movable-side electrode rod and the fixed-side electrode rod, and generates a magnetic field in an axial direction, which is a direction along an axis of both electrode rods, by current conduction; and a contact portion which is provided on an opposed side of each coil electrode, wherein
each coil electrode includes
a ring portion which is concentrically fixed to a corresponding one of both electrode rods,
a plurality of first coil portions which are disposed so as to be spaced apart from each other in a circumferential direction of the coil electrode by slits,
a plurality of power feeding portions which are provided at end portions of the plurality of first coil portions, respectively, and
at least one bypass portion which is provided so as to connect at least one corresponding first coil portion of the plurality of first coil portions and the ring portion so as to define a current path with a circumferential component between the corresponding first coil portion and the ring portion,
the at least one bypass portion has
a second coil portion which extends so as to have an overlap with the corresponding first coil portion and the power feeding portion opposed to the first coil portion, in the circumferential direction,
a first arm portion which connects the second coil portion and the ring portion, and
a second arm portion which connects the second coil portion and the first coil portion,
a first cutout is formed between the second coil portion and the ring portion so as to extend in the circumferential direction along the ring portion,
a second cutout is formed between the second coil portion and the first coil portion so as to extend in the circumferential direction along the first coil portion and the opposed power feeding portion, and
the coil electrode has a heat dissipation portion which is provided so as to extend in the circumferential direction at the first cutout from one end portion, close to the first coil portion, of the second coil portion.

6. The vacuum interrupter according to claim 1, wherein, when W1 and W2 denote a width of the overlap of the second coil portion with the first coil portion in the circumferential direction and a width of the overlap of the second coil portion with the power feeding portion in the circumferential direction, respectively, W1<W2 is satisfied.

7. A vacuum interrupter comprising: a fixed-side electrode rod which is fixed to one end portion of a container having a bottomed cylindrical shape; a movable-side electrode rod which is movably provided at another end portion of the container; a coil electrode which is provided at each of opposed ends of both electrode rods, which are the movable-side electrode rod and the fixed-side electrode rod, and generates a magnetic field in an axial direction, which is a direction along an axis of both electrode rods, by current conduction; and a contact portion which is provided on an opposed side of each coil electrode, wherein each coil electrode includes a ring portion which is concentrically fixed to a corresponding one of both electrode rods, a plurality of first coil portions which are disposed so as to be spaced apart from each other in a circumferential direction of the coil electrode by slits, a plurality of power feeding portions which are provided at end portions of the plurality of first coil portions, respectively, at least one bypass portion which is provided so as to connect at least one corresponding first coil portion of the plurality of first coil portions and the ring portion so as to define a current path with a circumferential component between the corresponding first coil portion and the ring portion, and a windmill plate which is disposed on a back side of the coil electrode, the at least one bypass portion has a second coil portion which extends so as to have an overlap with the corresponding first coil portion and the power feeding portion opposed to the first coil portion, in the circumferential direction, a first arm portion which connects the second coil portion and the ring portion, and a second arm portion which connects the second coil portion and the first coil portion, a first cutout is formed between the second coil portion and the ring portion so as to extend in the circumferential direction along the ring portion, a second cutout is formed between the second coil portion and the first coil portion so as to extend in the circumferential direction along the first coil portion and the opposed power feeding portion, a shallow groove and a deep groove which is a groove deeper than the shallow groove are formed on the back side of the coil electrode, the shallow groove is formed so as to correspond to a range including the ring portion, the first arm portion, the second coil portion, and the second arm portion, and a range from an end face, at the slit, of the first coil portion to an extension of the second arm portion, the deep groove is formed so as to correspond to a range from the power feeding portion to the second coil portion, and the windmill plate is attached to the shallow groove and the deep groove such that a leakage current is generated from the power feeding portion to the first coil portion opposed thereto across the power feeding portion.

8. The vacuum interrupter according to claim 7, wherein the windmill plate has a plurality of arc-shaped members which are radially disposed in the circumferential direction, and a windmill fitting portion which fixes the plurality of arc-shaped members to an axial center of a corresponding one of both electrode rods, an arc-shaped windmill cutout is formed in each of the arc-shaped members so as to be provided at the windmill fitting portion along the circumferential direction, and when an outer diameter of the first cutout is denoted by $\varphi b$, an inner diameter of the second cutout is denoted by $\varphi c$, and an outer diameter of the windmill cutout is denoted by $\varphi d$, a relationship of $\varphi b \leq \varphi d < \varphi c$ is satisfied.

9. The vacuum interrupter according to claim 7, wherein, when a depth in the axial direction of the shallow groove in the coil electrode is denoted by e, and a thickness in the axial direction of the windmill plate is denoted by t, a relationship of $e \leq t$ is satisfied.

10. The vacuum interrupter according to claim 7, wherein the deep groove is formed such that an outer diameter $\varphi h$ thereof is larger than an outer diameter $\varphi g$ of the shallow groove and smaller than an outer diameter $\varphi j$ of the coil electrode.

11. The vacuum interrupter according to claim 7, wherein when the outer diameter of the shallow groove is denoted by $\varphi g$, the outer diameter of the deep groove is denoted by $\varphi h$, an outer diameter of the windmill plate is denoted by $\varphi i$, and the outer diameter of the first coil portion is denoted by $\varphi j$, relationships of $\varphi g < \varphi h < \varphi j$ and $\varphi g = \varphi i$ are satisfied.

12. The vacuum interrupter according to claim 7, wherein the deep groove is formed in a region from the power feeding portion to a position away from the second coil portion in the circumferential direction by a dimension a such that a depth of the deep groove in the axial direction is uniform.

13. The vacuum interrupter according to claim 12, wherein the dimension a is larger than 0 mm and not larger than 5 mm.

* * * * *